(12) United States Patent
Jang

(10) Patent No.: US 12,308,387 B2
(45) Date of Patent: May 20, 2025

(54) PHOSPHAZENE COMPOUND-BASED ELECTROLYTE COMPOSITIONS, QUASI-SOLID AND SOLID-STATE ELECTROLYTES, AND LITHIUM BATTERIES

(71) Applicant: Global Graphene Group, Inc., Dayton, OH (US)

(72) Inventor: Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 0 days.

(21) Appl. No.: 17/164,912

(22) Filed: Feb. 2, 2021

(65) Prior Publication Data

US 2022/0255129 A1    Aug. 11, 2022

(51) Int. Cl.
  *H01M 10/0565*    (2010.01)
  *H01M 10/0525*    (2010.01)
  *H01M 10/0567*    (2010.01)
  *H01M 10/42*      (2006.01)

(52) U.S. Cl.
  CPC ... *H01M 10/0565* (2013.01); *H01M 10/0525* (2013.01); *H01M 10/0567* (2013.01); *H01M 10/4235* (2013.01); *H01M 2300/0034* (2013.01); *H01M 2300/0037* (2013.01); *H01M 2300/0082* (2013.01)

(58) Field of Classification Search
  None
  See application file for complete search history.

(56) References Cited

U.S. PATENT DOCUMENTS

| | | | |
|---|---|---|---|
| 2,798,878 A | 7/1957 | Hummers | |
| 5,437,943 A * | 8/1995 | Fujii | H01M 4/48 429/312 |
| 5,532,077 A | 7/1996 | Chu | |
| 9,059,481 B2 | 6/2015 | He et al. | |
| 9,368,831 B2 | 6/2016 | He et al. | |
| 9,601,803 B2 | 3/2017 | He et al. | |
| 9,601,805 B2 | 3/2017 | He et al. | |
| 2002/0014616 A1 * | 2/2002 | Allcock | C08G 79/025 252/500 |
| 2002/0185627 A1 * | 12/2002 | Chen-Yang | H01B 1/122 252/62.2 |
| 2003/0104283 A1 * | 6/2003 | Yamaguchi | H01M 10/0565 429/142 |
| 2005/0244704 A1 * | 11/2005 | Sloop | H01M 50/691 429/49 |
| 2010/0255371 A1 * | 10/2010 | Takayama | H01M 4/13 156/182 |
| 2012/0009412 A1 * | 1/2012 | Iwai | C08G 77/04 252/62 |
| 2013/0295465 A1 * | 11/2013 | Kaneko | H01M 4/13 429/188 |
| 2015/0017488 A1 * | 1/2015 | Dyer | H01M 6/38 429/52 |
| 2015/0044574 A1 * | 2/2015 | Cakmak | H01M 50/426 29/623.5 |
| 2016/0329569 A1 * | 11/2016 | Chen | H01M 8/0234 |
| 2017/0133720 A1 * | 5/2017 | Kim | H01M 10/10 |
| 2018/0205117 A1 * | 7/2018 | Fitié | H01M 10/054 |

FOREIGN PATENT DOCUMENTS

| | | | |
|---|---|---|---|
| CN | 103762380 | * | 4/2014 |
| WO | WO 2011/156419 | * | 12/2011 |

OTHER PUBLICATIONS

Machine translation of CN 103762380, published on Apr. 30, 2014 (Year: 2014).*
Jankowsky, S., Hiller, M.M., Wiemhofer, H.-D.—Preparation and electrochemical performance of polyphosphazene based salt-in-polymer electrolyte membranes for lithium ion batteries, Journal of Power Sources, 253 (2014), 256-262 (Year: 2014).*
Sulfolane, available online at https://en.wikipedia.org/wiki/Sulfolane, date unknown.*
Nazri, G., MacArthur, D.M., Ogara, J.F.—Polyphosphazene Electrolytes for Lithium Batteries, Chemistry of Materials 1989, 1, pp. 370-374 (Year: 1989).*
Blonsky, P.M., Shriver, D.F.—Complex Formation and Ionic Conductivity of Polyphosphazene Solid Electrolytes, Solid State Ionics, 18&19 (1986), pp. 258-264 (Year: 1986).*

(Continued)

*Primary Examiner* — Anca Eoff

(57) ABSTRACT

A rechargeable lithium battery comprising an anode, a cathode, and a quasi-solid or solid-state electrolyte in ionic communication with the anode and the cathode, wherein the electrolyte comprises a polyphosphazene polymer and a lithium salt dissolved or dispersed in the polymer, wherein the lithium salt occupies a weight fraction from 0.1% to 50% based on the total weight of the lithium salt and the polyphosphazene polymer combined; wherein the polyphosphazene polymer permeates into the anode and/or the cathode and in physical contact with the anode active material inside the anode and/or in physical contact with or chemically bonded to the cathode active material inside the cathode; and wherein the electrolyte further comprises from 0% to 50% by weight of a non-aqueous liquid solvent dispersed in the polymer, based on the total weight of the lithium salt, the polymer, and the non-aqueous liquid solvent combined.

16 Claims, 5 Drawing Sheets

(56) References Cited

OTHER PUBLICATIONS

Vinyl sulfone, available online at https://en.wikipedia.org/wiki/Vinyl_sulfone#:~:text=In%20organic%20chemistry%2C%20a%20vinyl,bonded%20to%20a%20sulfone%20group., date unknown.*
Ally phenyl sulfone, Sigma-Aldrich, available online at https://www.sigmaaldrich.com/US/en/product/aldrich/317713, date unknown.*
Allyl methyl sulfone, Sigma-Aldrich, available online at https://www.sigmaaldrich.com/US/en/product/aldrich/718203?utm_source=google&utm_medium=cpc&utm_campaign=10640609499&utm_content=103478955805&gclid=EAlalQobChMIn77C74i0hgMVEFxHAR09fQraEAAYASAAEgLnO_D_BwE, date unknown.*
Allyl methyl sulfide, available online at https://en.wikipedia.org/wiki/Allyl_methyl_sulfide, date unknown.*

* cited by examiner

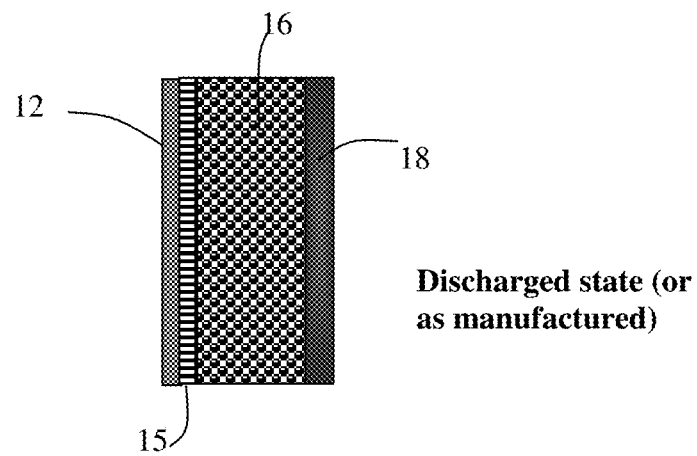
FIG. 2(A) Discharged state (or as manufactured)
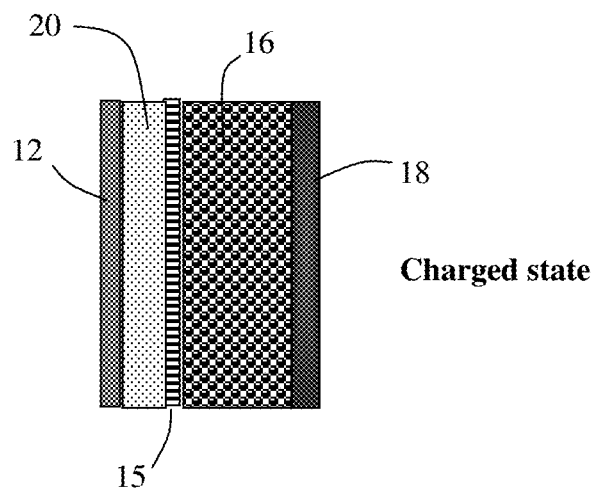
FIG. 2(B) Charged state

PHOSPHAZENE COMPOUND-BASED ELECTROLYTE COMPOSITIONS, QUASI-SOLID AND SOLID-STATE ELECTROLYTES, AND LITHIUM BATTERIES

FIELD

The present disclosure provides a fire-resistant electrolyte composition, quasi-solid and solid-state electrolytes therefrom, and lithium batteries (lithium-ion and lithium metal batteries) containing such an electrolyte.

BACKGROUND

Rechargeable lithium-ion (Li-ion) and lithium metal batteries (e.g., lithium-sulfur, lithium selenium, and Li metal-air batteries) are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than lithium-ion batteries (having a graphite anode).

However, the electrolytes used for lithium-ion batteries and all lithium metal secondary batteries pose some safety concerns. Most of the organic liquid electrolytes can cause thermal runaway or explosion problems.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature.

Although ILs were suggested as a potential electrolyte for rechargeable lithium batteries due to their non-flammability, conventional ionic liquid compositions have not exhibited satisfactory performance when used as an electrolyte likely due to several inherent drawbacks: (a) ILs have relatively high viscosity at room or lower temperatures; thus being considered as not amenable to lithium ion transport; (b) For Li—S cell uses, ILs are capable of dissolving lithium polysulfides at the cathode and allowing the dissolved species to migrate to the anode (i.e., the shuttle effect remains severe); and (c) For lithium metal secondary cells, most of the ILs strongly react with lithium metal at the anode, continuing to consume Li and deplete the electrolyte itself during repeated charges and discharges. These factors lead to relatively poor specific capacity (particularly under high current or high charge/discharge rate conditions, hence lower power density), low specific energy density, rapid capacity decay and poor cycle life. Furthermore, ILs remain extremely expensive. Consequently, as of today, no commercially available lithium battery makes use of an ionic liquid as the primary electrolyte component.

Solid state electrolytes are commonly believed to be safe in terms of fire and explosion proof. Solid state electrolytes can be divided into organic, inorganic, organic-inorganic composite electrolytes. However, the conductivity of organic polymer solid state electrolytes, such as poly(ethylene oxide) (PEO), polypropylene oxide (PPO), poly(ethylene glycol) (PEG), and poly(acrylonitrile) (PAN), is typically low ($<10^{-5}$ S/cm).

Although the inorganic solid-state electrolyte (e.g., garnet-type and metal sulfide-type) can exhibit a high conductivity (about $10^{-3}$ S/cm), the interfacial impedance or resistance between the inorganic solid-state electrolyte and the electrode (cathode or anode) is high. Further, the traditional inorganic ceramic electrolyte is very brittle and has poor film-forming ability and poor mechanical properties. These materials cannot be cost-effectively manufactured. Although an organic-inorganic composite electrolyte can lead to a reduced interfacial resistance, the lithium ion conductivity and working voltages may be decreased due to the addition of the organic polymer.

The applicant's research group has previously developed the quasi-solid state electrolytes (QSSE), which may be considered as a fourth type of solid state electrolyte. In certain variants of the quasi-solid state electrolytes, a small amount of liquid electrolyte may be present to help improving the physical and ionic contact between the electrolyte and the electrode, thus reducing the interfacial resistance. Examples of QSSEs are disclosed in the following: Hui He, et al. "Lithium Secondary Batteries Containing a Non-flammable Quasi-solid Electrolyte," U.S. patent application Ser. No. 13/986,814 (Jun. 10, 2013); U.S. Pat. No. 9,368,831 (Jun. 14, 2016); U.S. Pat. No. 9,601,803 (Mar. 21, 2017); U.S. Pat. No. 9,601,805 (Mar. 21, 2017); U.S. Pat. No. 9,059,481 (Jun. 16, 2015).

However, the presence of certain liquid electrolytes may cause some problems, such as liquid leakage, gassing, and low resistance to high temperature. Therefore, a novel electrolyte system that obviates all or most of these issues is needed.

Hence, a general object of the present disclosure is to provide a safe, flame/fire-resistant, quasi-solid or solid-state electrolyte system for a rechargeable lithium cell that is compatible with existing battery production facilities.

SUMMARY

The present disclosure provides a rechargeable lithium battery comprising an anode, a cathode, and a quasi-solid or solid-state electrolyte in ionic communication with the anode and the cathode, wherein the electrolyte comprises a polyphosphazene polymer and a lithium salt dissolved or dispersed in the polymer, wherein the lithium salt occupies a weight fraction from 0.1% to 50% based on the total weight of the lithium salt and the polyphosphazene polymer combined. The polyphosphazene polymer permeates into the anode and/or the cathode and in physical contact with and/or chemically bonded to the anode active material inside the anode and/or in physical contact with and/or chemically bonded to the cathode active material inside the cathode. The polyphosphazene polymer typically is also chemically bonded to the conductive additive (e.g., carbon black particles, carbon nanotubes, and graphene sheets, etc.) in the anode and/or the cathode. The polyphosphazene polymer can also chemically bond to the surfaces of a current collector (e.g., Cu foil and Al foil). Hence, the polyphosphazene polymer also plays the role of a binder in an electrode.

In some embodiments, the electrolyte further comprises from 0% to 50% by weight (preferably 0.1% to 50% and more preferably 1% to 30%) of a non-aqueous liquid solvent dispersed in the polymer, based on the total weight of the lithium salt, the polymer, and the non-aqueous liquid solvent combined.

Polyphosphazenes, also commonly referred to as poly(organo)phosphazenes, are a family of inorganic molecular hybrid polymers based on a phosphorus-nitrogen backbone substituted with organic side groups which show a broad array of unique properties due to the vast array of organic substituents possible.

The method of synthesizing polyphosphazenes depends on the desired type of polyphosphazene. A wide variety of reactive phosphazene compounds are available as a potential reactive precursor material (monomer, oligomer, or reactive polymer). In the present specification, a reactive phosphazene compound can mean a monomer, oligomer, or reactive polymer that can be chemically reacted (i.e., can undergo polymerization, including copolymerization, functional group substitution, such as replacing Cl— with an organic or organometallic group, and/or crosslinking). A curing agent refers to an initiator, catalyst, substituent (e.g., an organic or organometallic group), and/or a crosslinking agent that enables the desired chemical reaction (polymerization, substitution, and/or crosslinking).

The most widely used method for linear phosphazene polymers is based on a two-step process. In the first step, as an example, hexachlorocyclotriphosphazene, $(NPCl_2)_3$ (Chemical formula 1) is heated in a sealed system at 250° C. to convert it to a long chain linear polymer, $[NPCl_2]n$ (or Chemical formula 2), having typically 15,000 or more repeating units. This reaction is illustrated in the following Reaction 1:

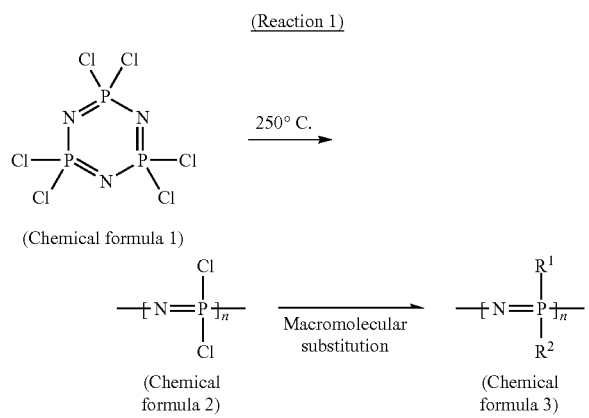

In the second step the chlorine atoms linked to phosphorus in the polymer are replaced by organic groups through reactions with $R^1$ or $R^2$ to form Chemical formula 3, where $R^1$ and $R^2$ are organic or organometallic groups (there is no particular restriction on the types of organic or organometallic groups that can be chosen). Preferably, $R^1$ and $R^2$ may be independently selected from alkoxides, aryloxides, amines, or organometallic groups, etc. Many different reagents (or called substituting agents or, simply "substituents") can be used in this macromolecular substitution reaction and, hence, a large number of different polymers can be produced. All these polymers are herein referred to as a polyphosphazene. Some examples of the macromolecular substitution are shown below (Reactions 2a, 2b, and 2c):

(Reactions 2a, 2b, and 2c)

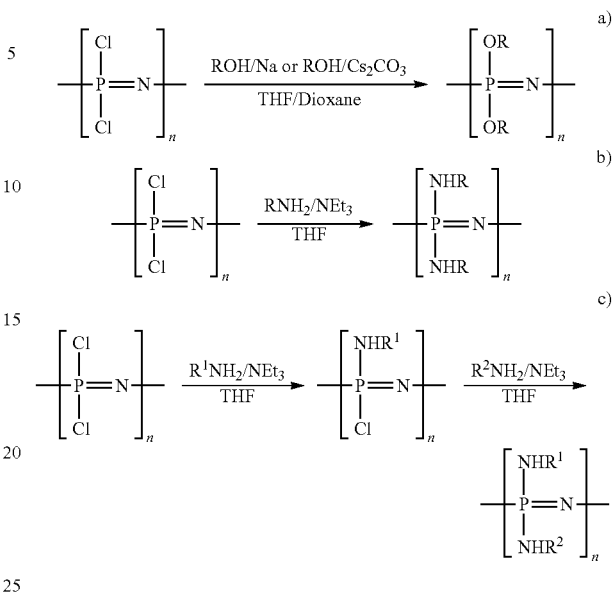

Polyphosphazene polymers include a wide range of hybrid inorganic-organic polymers with a number of different skeletal architectures that has the backbone —P—N—P—N—P—N—. In nearly all of these materials, two organic side groups are attached to each phosphorus center. Examples of phosphazene polymers include the following:
  a) Linear polymers have the formula $(N=PR^1R^2)_n$, where $R^1$ and $R^2$ are organic;
  b) Cyclolinear and cyclomatrix polymers in which small phosphazene rings are connected together by organic chain units.
  c) Block copolymer, star, dendritic, or comb-type structures.

More than 700 different polyphosphazenes are known, with different side groups (R) and different molecular architectures.

For discussion purposes, polyphosphazenes may be conveniently divided into two major classes-those in which the side groups are attached to phosphorus via oxygen (P—OR) or nitrogen (P—$NR_2$) linkages and those in which the substituents are attached directly to phosphorus through phosphorus-carbon bonds, i.e., the poly(alkyl phosphazenes and poly(aryl phosphazenes). The present disclosure provides both types of polyphosphazenes as an ingredient in the quasi-solid or solid electrolytes.

Preparation of block copolymers, graft polymers with organic side-chains, and other advanced architectures can also be achieved, such as polyphosphazenes with a branched polyphosphazene backbone, supramolecular structures from polyphosphazenes, helical structures with polyphosphazenes, cyclomatrix polyphosphazenes, and dendrimers from hexachloro-cyclotriphosphazene.

In certain preferred embodiments, the lithium salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (Li- BETI), lithium bis(fluorosulphonyl)imide, an ionic liquid lithium salt, or a combination thereof.

The electrolyte may further comprise from 0.1% to 50% (preferably 1%-30%) by weight of a non-aqueous liquid solvent dispersed in the polyphosphazene polymer, based on the total weight of the lithium salt, the polyphosphazene, and the non-aqueous liquid solvent combined.

The liquid solvent may be selected from a fluorinated carbonate, hydrofluoroether, fluorinated vinyl carbonate, fluorinated ester, fluorinated vinyl ester, fluorinated vinyl ether, sulfone, sulfide, nitrile, phosphate, phosphite, phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), or a combination thereof. Ionic liquids or organic liquids that are intrinsically flame-retardants are preferred.

For instance, the liquid solvent may be selected from fluorinated solvents, such as fluorinated vinyl carbonates, fluorinated esters, fluorinated vinyl esters, and fluorinated vinyl ethers. Fluorinated vinyl esters include $R_fCO_2CH=CH_2$ and Propenyl Ketones, $R_fCOCH=CHCH_3$, where $R_f$ is F or any F-containing functional group (e.g., $CF_2$— and $CF_2CF_3$—).

Two examples of fluorinated vinyl carbonates are given below:

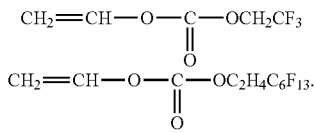

In some embodiments, the fluorinated carbonate is selected from fluoroethylene carbonate (FEC), DFDMEC, FNPEC, hydrofluoro ether (HFE), trifluoro propylene carbonate (FPC), methyl nonafluorobutyl ether (MFE), a combination thereof, wherein the chemical formulae for FEC, DFDMEC, and FNPEC, respectively are shown below:

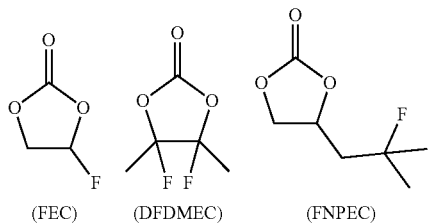

Sulfone-based liquid solvents include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone.

In certain embodiments, the sulfone-based liquid solvent is selected from TrMS, MTrMS, TMS, or vinyl or double bond-containing variants of TrMS, MTrMS, TMS, EMS, MMES, EMES, EMEES, or a combination thereof; their chemical formulae being given below:

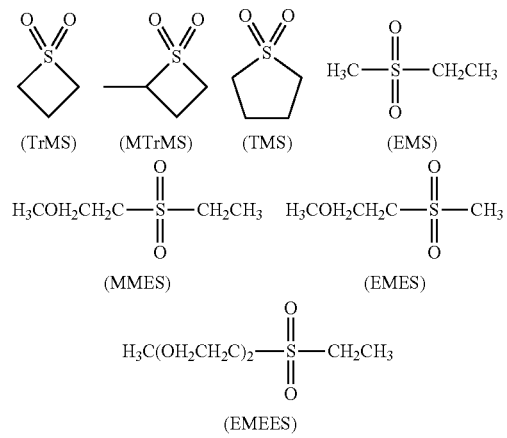

The nitrile may be selected from dinitriles, such as AND, GLN, and SEN, which have the following chemical formulae:

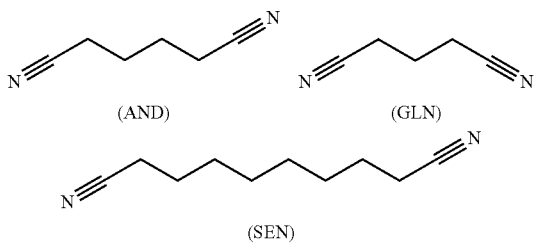

In some embodiments, the phosphate, phosphonate, phosphazene, phosphite, or sulfate as a liquid solvent is selected from tris(trimethylsilyl)phosphite (TTSPi), alkyl phosphate, triallyl phosphate (TAP), ethylene sulfate (DTD), a combination thereof.

The siloxane or silane may be selected from alkylsiloxane (Si—O), alkyylsilane (Si—C), liquid oligomeric silaxane (—Si—O—Si—), or a combination thereof.

The polymer in the electrolyte may comprise a network of crosslinked chains comprising a group selected from a hydroxyl group, an amino group, an imino group, an amide group, an acrylic amide group, an amine group, an acrylic group, an acrylic ester group, or a mercapto group in the polymer. The amide group may be selected from N,N-dimethylacetamide, N,N-diethylacetamide, N,N-dimethylformamide, N,N-diethylformamide, or a combination thereof.

The cathode in the disclosed lithium cell typically comprises particles of a cathode active material and the electrolyte permeates into the cathode and is in physical contact with substantially all the cathode active material particles.

In some preferred embodiments, the battery cell contains substantially no liquid solvent left therein (substantially all of the liquid monomer being polymerized to become a polymer and non-polymerizable liquid solvent removed). However, it is essential to initially include a liquid solvent in the cell (particularly if the precursor monomer itself is not in a liquid state), enabling the lithium salt to get dissociated into lithium ions and anions. A majority (>50%, preferably >70%) or substantially all of the liquid solvents is then removed after polymerization. With substantially 0% liquid solvent, the resulting electrolyte is a solid-state electrolyte. With less than 30% liquid solvent, we have a quasi-solid electrolyte. Both are highly flame-resistant.

A lower proportion of the liquid solvent in the electrolyte leads to a significantly reduced vapor pressure and increased flash point or completely eliminated flash point (un-detectable). Although typically by reducing the liquid solvent proportion one tends to observe a reduced lithium-ion conductivity for the resulting electrolyte; however, quite surprisingly, after a threshold liquid solvent fraction, this trend is diminished or reversed (the lithium ion conductivity can actually increase with reduced liquid solvent in some cases).

In some embodiments, the electrolyte further comprises a flame-retardant additive selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

In the electrolyte, the flame-retardant additive may be in a form of encapsulated particles comprising the additive encapsulated by a shell of a substantially lithium ion-impermeable and liquid electrolyte-impermeable coating material, wherein said shell is breakable when exposed to a temperature higher than a threshold temperature.

The flame-retardant additive proportion in the polymer is preferably from 1% to 50%, more preferably from 10% to 30%.

The polyvinyl phosphonate polymer in the electrolyte may form a mixture, copolymer, semi-interpenetrating network, or simultaneous interpenetrating network with a second polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazene, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof. This second polymer may be pre-mixed into an anode and/or a cathode. Alternatively, this second polymer may be dissolved in the liquid solvent where appropriate or possible to form a solution prior to being injected into the battery cell.

In certain desirable embodiments, the electrolyte further comprises particles of an inorganic solid electrolyte material having a particle size from 2 nm to 30 μm, wherein the particles of inorganic solid electrolyte material are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (UPON), garnet-type, lithium superionic conductor (LISICON) type, sodium superionic conductor (NASICON) type, or a combination thereof.

The presently disclosed rechargeable lithium battery may be a lithium metal secondary cell, a lithium-ion cell, a lithium-sulfur cell, a lithium-ion sulfur cell, a lithium-selenium cell, or a lithium-air cell. This battery features a flame-resistant, safe, and high-performing electrolyte as herein disclosed.

The rechargeable lithium cell may further comprise a separator disposed between the anode and the cathode. Preferably, the separator comprises a quasi-solid or solid-state electrolyte as herein disclosed.

The polyphosphazene polymer may be initially in a liquid monomer state, which can be injected into the battery cell and then cured (polymerized and/or crosslinked) in situ inside the cell.

Alternatively, the reactive liquid mass (monomer, oligomer, or reactive polymer, along with the needed curing agent (e.g., initiator, substituent, and/or crosslinking agent) may be mixed with an electrode active material (e.g., cathode active material particles, such as NCM, NCA and lithium iron phosphate), a conducting additive (e.g., carbon black, carbon nanotubes, expanded graphite flakes, or graphene sheets), and an optional flame-retardant agent and/or optional particles of an inorganic solid electrolyte to form a reactive slurry or paste. The slurry or paste is then made into a desired electrode shape (e.g., cathode electrode), possibly supported on a surface of a current collector (e.g., an Al foil as a cathode current collector). An anode of a lithium-ion cell may be made in a similar manner using an anode active material (e.g., particles of graphite, Si, SiO, etc.). The anode electrode, a cathode electrode, and an optional separator are then combined to form a battery cell. The reactive monomer, oligomer, or polymer inside the cell is then polymerized and/or crosslinked in situ inside the battery cell.

The electrolyte composition is designed to permeate into the internal structure of the cathode and to be in physical contact or ionic contact with the cathode active material in the cathode, and to permeate into the anode electrode to be in physical contact or ionic contact with the anode active material where/if present.

The flash point of the quasi-solid electrolyte is typically at least 100 degrees higher than the flash point of the organic liquid solvent alone. In most of the cases, either the flash point is higher than 200° C. or no flash point can be detected. The electrolyte just would not catch on fire or get ignited. Any accidentally initiated flame does not sustain for longer than a few seconds. This is a highly significant discovery, considering the notion that fire and explosion concern has been a major impediment to widespread acceptance of battery-powered electric vehicles. This new technology could potentially reshape the landscape of EV industry.

Still another preferred embodiment of the present disclosure is a rechargeable lithium-sulfur cell or lithium-ion sulfur cell containing a sulfur cathode having sulfur or lithium polysulfide as a cathode active material.

For a lithium metal cell (where lithium metal is the primary active anode material), the anode current collector may comprise a foil, perforated sheet, or foam of a metal having two primary surfaces wherein at least one primary surface is coated with or protected by a layer of lithiophilic metal (a metal capable of forming a metal-Li solid solution or is wettable by lithium ions), a layer of graphene material, or both. The metal foil, perforated sheet, or foam is preferably selected from Cu, Ni, stainless steel, Al, graphene-coated metal, graphite-coated metal, carbon-coated metal, or a combination thereof. The lithiophilic metal is preferably selected from Au, Ag, Mg, Zn, Ti, K, Al, Fe, Mn, Co, Ni, Sn, V, Cr, an alloy thereof, or a combination thereof.

For a lithium ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

In some embodiments, the anode active material contains a prelithiated Si, prelithiated Ge, prelithiated Sn, prelithiated $SnO_x$, prelithiated $SiO_x$, prelithiated iron oxide, prelithiated $V_2O_5$, prelithiated $V_3O_8$, prelithiated $Co_3O_4$, prelithiated $Ni_3O_4$, or a combination thereof, wherein x=1 to 2.

The separator may comprise the presently disclosed electrolyte. In certain embodiments, the separator comprises polymeric fibers, ceramic fibers, glass fibers, or a combination thereof. These fibers may be stacked together in such a manner that there are pores that allow for permeation of lithium ions, but not for penetration of any potentially formed lithium dendrites. These fibers may be dispersed in a matrix material or bonded by a binder material, which may be a polyphosphazene polymer. This matrix or binder material may contain a ceramic or glass material. The polymer electrolyte may serve as the matrix material or binder material that helps to hold these fibers together. The separator may contain particles of a glass or ceramic material (e.g., metal oxide, metal carbide, metal nitride, metal boride, etc.).

The rechargeable lithium cell may further comprise a cathode current collector selected from aluminum foil, carbon- or graphene-coated aluminum foil, stainless steel foil or web, carbon- or graphene-coated steel foil or web, carbon or graphite paper, carbon or graphite fiber fabric, flexible graphite foil, graphene paper or film, or a combination thereof. A web means a screen-like structure or a metal foam, preferably having interconnected pores or through-thickness apertures.

The present disclosure also provides a reactive liquid electrolyte composition comprising a lithium salt and a curing agent (e.g., an initiator, a substituent, and/or a cross-linking agent) dissolved or dispersed in a liquid medium which comprises a reactive phosphazene compound (in a monomer, oligomer, or reactive polymer state). The reactive phosphazene compound may be initially in a liquid state at room temperature. The electrolyte composition may further comprise a non-aqueous liquid solvent, particularly if the reactive phosphazene compound itself is not in a liquid state at a temperature from 0° C. to 100° C.

In certain preferred embodiments, the electrolyte composition comprises: (a) a first solution, comprising the reactive phosphazene compound which is in a liquid state or is dissolved in a first non-aqueous liquid solvent; and (b) a second solution, comprising a lithium salt and a curing agent (e.g., an initiator, a substituent, and/or a crosslinking agent), and a second non-aqueous liquid solvent; wherein the first solution and the second solution are stored separately before the first solution and the second solution are mixed to form an electrolyte.

The first non-aqueous liquid solvent may be the same as or different than the second non-aqueous liquid solvent. Either liquid solvent may be selected from those discussed earlier in this section.

The lithium salt in the electrolyte composition may be selected from those listed earlier in this section.

In certain embodiments, the initiator is selected from an azo compound (e.g., azodiisobutyronitrile, AIBN), azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl)peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile, benzoylperoxide (BPO), hydrogen peroxide, dodecamoyl peroxide, isobutyryl peroxide, cumene hydroperoxide, tert-butyl peroxypivalate, diisopropyl peroxydicarbonate, or a combination thereof. These initiators may or may not be used in combination with a lithium salt. The initiator may also be selected from $n-C_4H_9Li$, $(C_5H_5)_2Mg$, $(i-C_4H_9)_3Al$, a carbenium salt, $CF_3SO_3CH_3$, $CF_3SO_3C_2H_5$, $(CF_3SO_2)O$, $Ph_3C^+AsF_6^-$, 1-hydroxycyclohexylphenyl ketone, dibenzoyl, benzoyl methyl ether, benzoyl ethyl ether, p-chlorobenzophenone, p-methoxybenzophenone, di-tert.-butyl peroxide and camphaquinone, phosphite, a cationic initiator, an acid, a lithium salt, or a combination thereof. The lithium salt may be selected from the list in the foregoing paragraph. Other types of lithium salts may also be used.

The disclosure also provides a reactive liquid electrolyte composition comprising a non-aqueous liquid solvent, a lithium salt, a reactive phosphazene compound, and a curing agent (e.g. an initiator, catalyst, substituent, and/or crosslinking agent) dissolved in the liquid solvent. In this electrolyte composition, the non-aqueous liquid solvent, the lithium salt, and the phosphazene compound may be selected from those discussed earlier in this section. This reactive liquid electrolyte composition may further comprise a flame retardant and/or particles of an inorganic solid electrolyte dispersed therein.

The present disclosure also provides a method of producing the disclosed rechargeable lithium cell, the method comprising: (a) Combining an anode, an optional separator layer, a cathode, and a protective housing to form a cell; (b) Introducing a reactive liquid electrolyte composition into the cell, wherein the reactive liquid electrolyte composition comprises at least a reactive phosphazene compound (i.e. in a monomer, oligomer, or reactive polymer form), an optional non-aqueous liquid solvent, a lithium salt dissolved in the reactive monomer or oligomer or dissolved in the liquid solvent, a curing agent (e.g. an initiator, catalyst, substituent, and/or crosslinking agent); and (c) Partially or totally curing the reactive electrolyte composition (e.g. polymerizing the monomer or oligomer, effecting, side group substitution, and/or crosslinking) to obtain a quasi-solid or solid-state electrolyte wherein at least 30% by weight (preferably >50%, further preferably >70%, and most preferably >99%) of the phosphazene compound is chemically reacted (e.g. monomer or oligomer is polymerized, substituted, or crosslinked).

In this method, the reactive liquid electrolyte composition may further comprise a second liquid solvent and step (c) either does not polymerize the second liquid solvent or polymerizes the second liquid solvent to a different extent as compared to the monomer or oligomer.

The disclosure further provides a method of producing the rechargeable lithium cell, the method comprising: (A) Mixing particles of a cathode active material, an optional conductive additive, an optional binder, and a reactive electrolyte composition to form a cathode, wherein the reactive electrolyte composition comprises a lithium salt and an initiator or a curing agent (initiator, substituent, or crosslinking agent) dissolved or dispersed in a reactive liquid medium comprising a reactive phosphazene compound; (B) providing an anode; (C) combining the cathode and the anode to form a cell; and (D) partially or totally polymerizing the monomer or oligomer, prior to or after step (C), to produce the rechargeable lithium cell, wherein at least 30% by weight of the reactive phosphazene compound is reacted (polymerized, substituted, or crosslinked).

In this method, the anode may be prepared in a similar manner, wherein step (13) may comprise a procedure of mixing particles of an anode active material, an optional conductive additive, an optional binder, a reactive additive, and a lithium salt to form an anode, wherein the reactive additive comprises at least a phosphazene compound and a curing agent (initiator, substituent, or crosslinking agent) and wherein the method further comprises polymerizing and/or crosslinking the monomer or oligomer, prior to or after step (C), to produce the rechargeable lithium cell.

In the method, step (A) may further comprise adding particles of an inorganic solid electrolyte powder in the cathode or in the anode.

After step (D), one may choose to conduct a step (E) of injecting a second liquid solvent into the cell. This second liquid solvent may be polymerizable or non-polymerizable.

The procedure of polymerizing and/or crosslinking may comprise exposing the reactive additive to heat, UV, high-energy radiation, or a combination thereof. The high-energy radiation may be selected from electron beam, Gamma radiation, X-ray, neutron radiation, etc. Electron beam irradiation is particularly useful.

The disclosure also provides an anode comprising an anode active material that is mixed with the presently disclosed electrolyte composition (along with a conductive filler and an optional binder) and is in physical contact with or chemically bonded to the electrolyte composition upon curing.

Also disclosed is a cathode comprising particles of a cathode active material that are mixed with the electrolyte composition (along with a conductive filler and an optional binder) and is in physical contact with or chemically bonded to the electrolyte composition upon curing.

These and other advantages and features of the present disclosure will become more transparent with the description of the following best mode practice and illustrative examples.

BRIEF DESCRIPTION OF THE DRAWINGS

FIG. 2(A) Structure of an anode-less lithium metal cell (as manufactured or in a discharged state) according to some embodiments of the present disclosure;

FIG. 2(B) Structure of an anode-less lithium metal cell (in a charged state) according to some embodiments of the present disclosure.

DETAILED DESCRIPTION

Figure 1A:
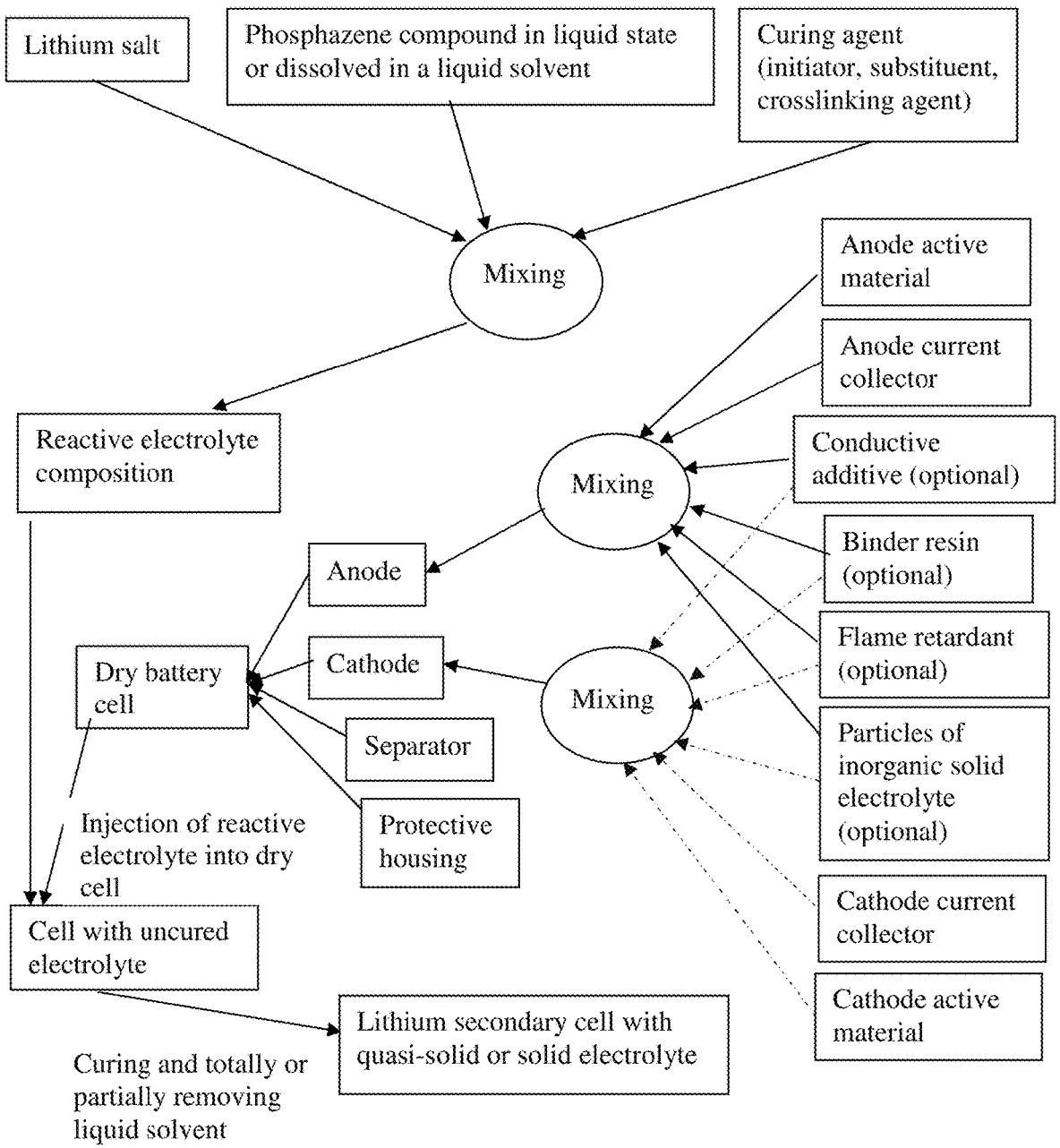
FIG. 1(A) A process flow chart to illustrate a method of producing a lithium metal battery comprising a substantially solid-state electrolyte according to some embodiments of the present disclosure.

The present disclosure provides a safe and high-performing lithium battery, which can be any of various types of lithium-ion cells or lithium metal cells. A high degree of safety is imparted to this battery by a novel and unique electrolyte that is highly flame-resistant and would not initiate a fire or sustain a fire and, hence, would not pose explosion danger. This disclosure has solved the very most critical issue that has plagued the lithium-metal and lithium-ion industries for more than two decades.

As indicated earlier in the Background section, a strong need exists for a safe, non-flammable, yet injectable quasi-solid electrolyte (or practically solid-state electrolyte) system for a rechargeable lithium cell that is compatible with existing battery production facilities. It is well-known in the art that solid-state electrolyte battery typically cannot be produced using existing lithium-ion battery production equipment or processes.

The present disclosure provides a rechargeable lithium battery comprising an anode, a cathode, and a quasi-solid or solid-state electrolyte in ionic communication with the anode and the cathode, wherein the electrolyte comprises a polyphosphazene polymer and a lithium salt dissolved or dispersed in the polymer, wherein the lithium salt occupies a weight fraction from 0.1% to 50% based on the total weight of the lithium salt and the polyphosphazene polymer combined. The polyphosphazene polymer permeates into the anode and/or the cathode and in physical contact with and/or chemically bonded to the anode active material inside the anode, and/or in physical contact with and/or chemically bonded to the cathode active material inside the cathode. The polyphosphazene polymer typically is also chemically bonded to the conductive additive (e.g., carbon black particles, carbon nanotubes, and graphene sheets, etc.) in the anode and/or the cathode. The polyphosphazene polymer can also chemically bond to the surfaces of a current collector (e.g., Cu foil and Al foil). Hence, the polyphosphazene polymer also plays the role of a binder in an electrode.

Preferably, the polyphosphazene polymer is impregnated with a non-aqueous solvent (an organic or ionic liquid solvent) that permeates into spaces between polymer chains and being held in place by the polymer chains. The organic liquid is preferably selected from a flame retardant solvent.

It may be noted that a narrow group of polyphosphazene polymers (i.e., a linear polymer with —(N=PR$_2$)— units, grafted with ethylene oxide side chains or methoxyethoxy-ethoxy-substituted phosphazene) were investigated as a solid electrolyte membrane: N. Kaskhedikar, M. Burjanadze, Y. Karatas, H. D. Wiemhofer, Solid State Ionics, 177 (2006) 3129-3134; S. Jankowsky, M. M. Hiller, H.-D. Wiemhöfer, Journal of Power Sources 253 (2014) 256-262. However, these polymers were made into a solid electrolyte membrane disposed as a separator between an anode and a cathode. These polymers are not present inside the anode to make contact with the anode active material (e.g., graphite particles) and not chemically bonded to particles of the anode active materials. Additionally, these polymers are not present inside the cathode to make contact with the cathode active material (e.g., lithium transition metal oxide particles) and not chemically bonded to particles of the cathode active materials. These polymers are not in contact with the anode current collector (e.g., Cu foil) or the cathode current collector (e.g., Al foil); to the contrary, these polymer membranes are in the middle of a battery cell, electronically separating the anode from the cathode.

Polyphosphazenes, also commonly referred to as poly(organo)phosphazenes, are a family of inorganic molecular hybrid polymers based on a phosphorus-nitrogen backbone substituted with organic side groups which show very differing properties due to the vast array of organic substituents possible. The method of synthesizing polyphosphazenes depends on the desired type of polyphosphazene. The most widely used method for linear polymers is based on a two-step process. In the first step, hexachlorocyclotriphosphazene, $(NPCl_2)_3$ (Chemical formula 1) is heated in a sealed system at 250° C. to convert it to a long chain linear polymer, $[NPCl_2]n$ (or Chemical formula 2), having typically 15,000 or more repeating units. This reaction is illustrated in the following Reaction 1:

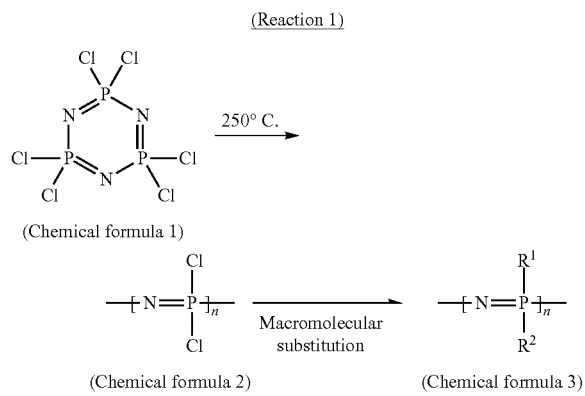

(Reaction 1)

(Chemical formula 1)

(Chemical formula 2)    (Chemical formula 3)

In the second step the chlorine atoms linked to phosphorus in the polymer are replaced by organic groups through reactions with $R^1$ or $R^2$ to form Chemical formula 3, where $R^1$ and $R^2$ may be independently selected from alkoxides, aryloxides, amines, or organometallic reagents, etc. Many different reagents can be used in this macromolecular substitution reaction and, hence, a large number of different polymers can be produced. All these polymers are herein referred to as a polyphosphazene. Some examples of the macromolecular substitution are shown below (Reactions 2a, 2b, and 2c):

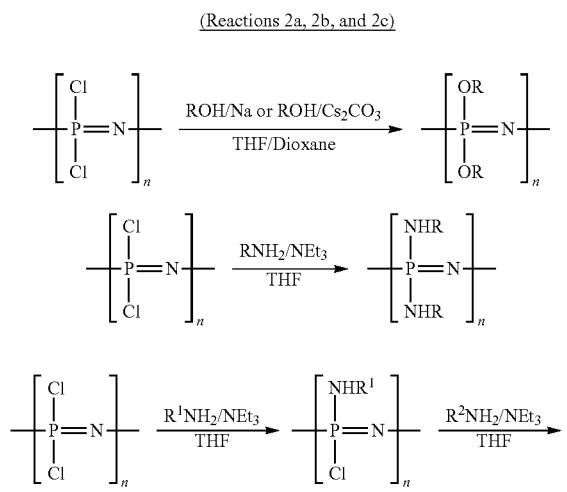

(Reactions 2a, 2b, and 2c)

-continued

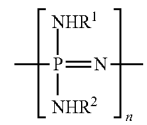

Polyphosphazene polymers include a wide range of hybrid inorganic-organic polymers with a number of different skeletal architectures that has the backbone P—N—P—N—P—N—. In nearly all of these materials two organic side groups are attached to each phosphorus center. Examples of phosphazene polymers include the following:

(a) Linear polymers have the formula $(N=PR^1R^2)_n$, where $R^1$ and $R^2$ are organic;
(b) Cyclolinear and cyclomatrix polymers in which small phosphazene rings are connected together by organic chain units.
(c) Block copolymer, star, dendritic, or comb-type structures.

More than 700 different polyphosphazenes are known, with different side groups (R) and different molecular architectures.

For discussion purposes, polyphosphazenes may be conveniently divided into two major classes-those in which the side groups are attached to phosphorus via oxygen (P—OR) or nitrogen (P—NR$_2$) linkages and those in which the substituents are attached directly to phosphorus through phosphorus-carbon bonds, i.e., the poly(alkyl phosphazenes and poly(aryl phosphazenes). The present disclosure provides both types of polyphosphazenes as an ingredient in the quasi-solid or solid electrolytes.

It is also possible to achieve controlled polymerization of $[NPCl_2]n$ via a living cationic polymerization of trichlorophosphoranimine ($Cl_3PNSiMe_3$). This can be carried out in solution at room temperature via reaction of $Cl_3PNSiMe_3$ with two equivalents of $PCl_5$ giving a cationic species $[Cl_3PNPCl_3]^+$ with $PCl_6^-$ as the counterion (Reaction 3a). This species can initiate the polymerization upon addition of further equivalents of $Cl_3PNSiMe_3$ leading to polymer chains with a "living" cationic end group. One equivalent of $ClSiMe_3$ is formed as a side product with every monomer molecule added to the polymer, making this polymerization a rare example of a polycondensation reaction which occurs via a chain growth mechanism (compared to most polycondensation reactions having a step-growth mechanism). The living chain growth mechanism, with one cationic initiator per propagating chain, allows not only control of molecular weight via the feed monomer to initiator ratio, but also leads to poly(dichloro) phosphazenes with a narrow index of polydispersity. Reaction times may vary depending on the desired polymer chain length, the monomer concentration and the nature of the counter ion, but $Cl_3PNSiMe_3$ is observed to be consumed completely relatively quickly within a few hours in dichloromethane.

The living cationic polymerization requires large amounts of the monomer $Cl_3PNSiMe_3$ of high purity, usually prepared via reaction of $PCl_3$ with $LiN(SiMe_3)_2$ to form $Cl_2PN(SiMe_3)_2$, followed by oxidation with the chlorinating agent $SO_2Cl_2$ to give $Cl_3PNSiMe_3$. To incorporate polyphosphazene into a battery cell, we have invented a method to produce $[NPCl_2]_n$, directly via in situ preparation and polymerization of $Cl_3PNSiMe_3$. This route could facilitate upscaling and the industrial preparation of polyphosphazene in a battery, as it avoids the vacuum distillation of the monomer.

When PCl$_5$ is used to form the cationic initiator for the living polymerization of Cl$_3$PNSiMe$_3$ (Reaction 3a), some bidirectional growth can be observed due to the ability of the cationic propagating site to migrate. Furthermore, both end groups are identical after macro-substitution of the chlorine atoms, thus limiting the options in terms of the preparation of polymers with higher architectures. However, monodirectional growth can be achieved via the use of R$_3$PNSiMe$_3$ type moieties (Reaction 3b). Reaction of such phosphoranimines with two equivalents of PCl$_5$ gives a cationic species capable of initiating the polymerization of Cl$_3$PNSiMe$_3$ via an identical mechanism. The R groups, typically phenyl groups, effectively block one end of the initiating species, forcing the polymerization to proceed in only one direction and more importantly resulting in polymers with defined chain ends.

(Reactions 3a, 3b, and 3c)

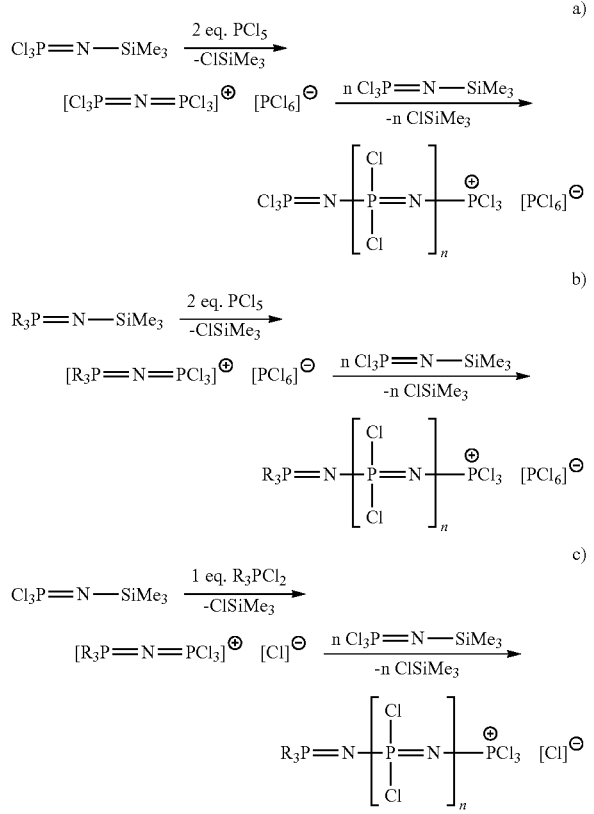

It is also possible to directly synthesize poly(organo)phosphazenes, without going through the [NPCl$_2$]$_n$ precursor route. For instance, one can conduct the anionic polymerization of N-silylphosphoranimines with fluoride ion initiators in the presence of N-methylimidazole (Reaction 4):

(Reactions 4)

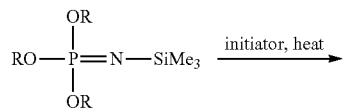

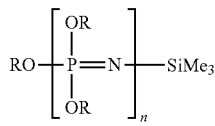

This polymerization has living character and enables the preparation of polymers with an index of polydispersity between 1.3 and 2.3 at 125° C. The polymerization of similar N-silylphosphoranimines can be initiated by H$_2$O with a catalytic amount of N-methylimidazole with good living polymerization kinetics, enabling robust preparation of poly(bistrifluoroethoxy phosphazene). The same method can be followed to prepare poly(organo)phosphazenes with excellent control of molecular weight and polydispersity from a wider range of monomers.

Poly(alkyl/aryl)phosphazenes, [NPR$_2$]n, whereby the organic substituent is directly attached via a P—C bond, can also be prepared via direct polymerization routes. Initially developed by thermal (100-180° C.) condensation of (CF$_3$CH$_2$O)R$_2$PQNSiMe$_3$ type monomers, this can be used for cationic initiators and with monomers of the type BrR$_2$PQNSiMe$_3$. The polymerization of halo(alkyl/aryl) phosphoranimines (XR$_2$PNSiMe$_3$, X=Br or Cl) initiated by organic phosphites ((MeO)$_3$P can be an effective route to poly(alkyl/aryl)phosphazenes at ambient temperature (Reaction 5).

(Reaction 5)

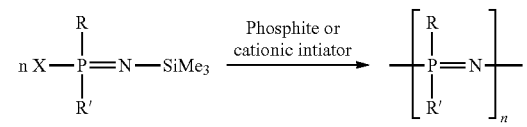

Additionally, such phosphoranimines can be combined with the cationic polymerization of [NPCl$_2$]n (Reaction 6), thus allowing the preparation of block copolymers:

(Reaction 6)

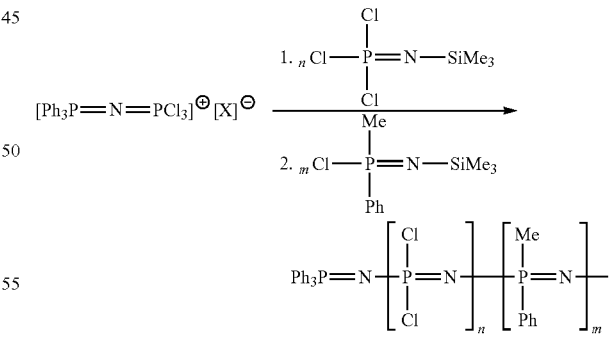

Preparation of block copolymers, graft polymers with organic side-chains, and other advanced architectures, such as polyphosphazenes with a branched polyphosphazene backbone, supramolecular structures from polyphosphazenes, helical structures with polyphosphazenes, cyclomatrix polyphosphazenes, and dendrimers from hexachlorocyclotriphosphazene, can also be achieved.

The polyphosphazene polymer preferably is synthesized from a reactive precursor monomer, oligomer, or polymer selected from Chemical formula 1, Chemical formula 2, Chemical formula 3, Chemical formula 4, or a combination thereof:

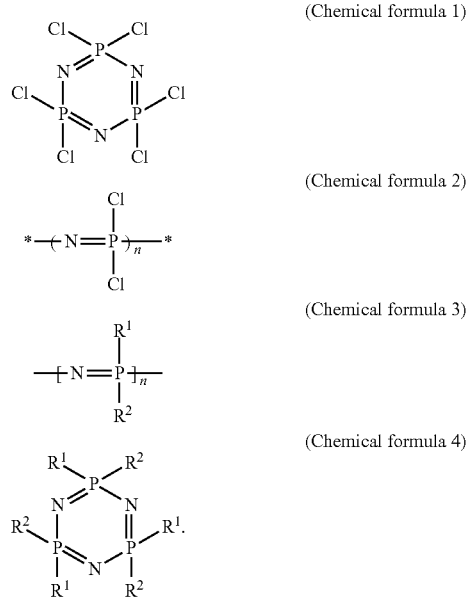

(Chemical formula 1)

(Chemical formula 2)

(Chemical formula 3)

(Chemical formula 4)

In these formulae, R, R$^1$, and R$^2$ may be independently selected from organic groups (e.g. alkoxides, aryloxides, and amine groups) and organometallic groups, etc.

A desirable group of polymerizable phosphazene derivative or compound is of the general formula: [—NP(A)a(B)b-]$_x$ (Chemical formula 5), wherein the groups A and B are bonded to phosphorous atoms through —O—, —S—, —NH—, or —NR—, wherein R is a C$_1$-C$_6$ alkyl group; A contains at least one of a vinyl ether group of the general formula Q—O—CR'=CHR" and a styrene ether group of the general formula:

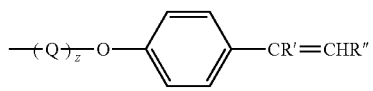

wherein at least one of R' and R" are hydrogen or a C$_1$-C$_{10}$ alkyl group; B is a reactive or nonreactive hydrocarbon group optionally containing at least one of O, S, and N, and optionally containing at least one reactive group; Q is one of an aliphatic, cycloaliphatic, aromatic, and heterocyclic hydrocarbon group optionally containing at least one of O, S, and N; a is a number greater than 0; b is 0 or a number greater than 0; a+b=2, x stands for a whole number that is at least 2; and z stands for 0 or 1.

Further desirably, A is of the general formula:

and B=Z'—YH, so that the phosphazene derivative is of the general formula:

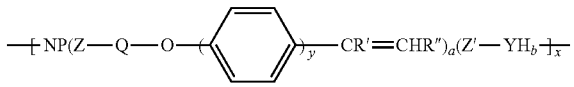

wherein Z and Z' are the same or different and each e stands for —O—, —S—, —NH—, or —NR— wherein R is a C$_1$-C$_6$ alkyl; Q is at least one of an aliphatic, cycloaliphatic, aromatic, and heterocyclic hydrocarbon group optionally containing at least one of O, S, and N; YH stands for at last one of an aliphatic, cycloaliphatic, aromatic, and heterocyclic hydrocarbon group optionally containing at least one of O, S, and N and optionally containing a reactive group different from a vinyl ether group or a styrene ether group; y is 0 or 1; x is a whole number from 2 to 20; and a, b, R' and R" are defined as above.

The presently disclosed phosphazenes (also commonly referred to as phosphazene derivatives or phosphazene compounds) can be cured by a process that is initiated cationically, which bears many advantages. The phosphazene derivatives of the disclosure can contain two or more different vinyl ether groups and/or both vinyl ether groups and styrene ether groups in one molecule. These phosphazene derivatives, which can be polymerized cationically at least when substituted by vinyl ether groups, and polymerization of these phosphazenes can be initiated by acids. Phosphite or other cationic initiators may be used. They have one or more of the following advantages: complete substitution of the phosphazene and thus absence of chlorine can be achieved in high yields; oxygen does not inhibit the curing of the presently disclosed phosphazene derivatives; they are normally less viscous and therefore more suitable for injection into dry battery cells.

In some preferred embodiments, in the polymerizable phosphazene derivatives designated as [—NP(A)a(B)b-]$_x$ (Chemical formula 5), A and B are identical to or different from each other and independently represent a polymerization curable group containing an acryl group, a methacryl group, a vinyl group or an allyl group or a non-polymerization curable group, including a hydrogen atom, a halogen atom, a phenoxy group, a halogenated phenoxy group, an alkoxy group, a halogenated alkoxy group, an amino group, an alkylamino group, a halogenated alkylamino group or a mercapto group, provided however that at least one of A and B is a polymerization curable group; a and b are independently each 0 or an integer larger than 0, provided however that the sum of a and b is 2; and n is an integer of 3 or larger.

In this general formula [—NP(A)a(B)b-]$_x$, the polymerization curable group referred to by the reference symbol A and B is not restricted to any particular group as long as the group is provided with an unsaturated linkage polymerizable with heating or upon exposure to ultraviolet light, electron beam, or other forms of high-energy radiation and includes a group containing an acryl group, a methacryl group, a vinyl group or an allyl group. Preferred are an acryloyloxy group and a methacryloyloxy group from the viewpoint of the curing rate.

In this general formula, the non-polymerization curable group referred to by the reference symbol A and B can include a hydrogen atom, a halogen atom, a phenoxy group, a halogenated phenoxy group, an alkoxy group, a halogenated alkoxy group, an amino group, an alkylamino group, a halogenated alkylamino group or a mercapto group.

In order to improve the flame retardancy, there may be introduced, as a non-polymerization group, a fluorine-containing group as represented by the following general formula:—OCH$_2$(CF$_2$)$_m$Z$^1$, wherein m is an integer from 1 to 4; and Z' is a hydrogen atom or a fluorine atom, or as represented by the following general formula:—OCH (CF$_3$)$_2$.

A fluoride capable of introducing the fluorine-containing group may include, for example, 2,2,2-trifluoroethanol, 2,2,3,3,3-pentafluoro-1-propanol, 2,2,3,3,4,4,4-heptafluoro-1-butanol, 2,2,3,3-tetrafluoro-1-propanol, 2,2,3,3,4,4,5,5-octafluoro-1-pentanol, and 1,1,1,3,3,3-hexafluoro-2-propanol.

In accordance with certain embodiments of the present disclosure, the group represented by the reference symbols A and/or B in the general formula above is preferably a group as represented by the following Chemical formula 6:

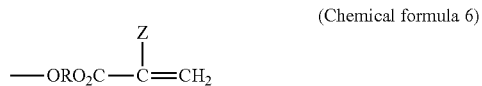

(Chemical formula 6)

wherein R is an alkylene group having from 1 to 12 carbon atoms; and Z is a hydrogen atom or a methyl group. In the general formula, the alkylene group referred to by the reference symbol R may include a linear or branched alkylene group, and an ethylene group is a preferred alkylene group.

Representative examples of the groups represented by the Chemical formula (6) above may include, for example, a residue (hereinafter referred to sometimes as a methacrylate residue) obtainable by removing a hydrogen atom from the hydroxy group of a methacrylate, such as 2-hydroxyethyl methacrylate, 2-hydroxypropyl methacrylate, 2-hydroxybutyl methacrylate, 3-hydroxybutyl methacrylate, 4-hydroxybutyl methacrylate, 5-hydroxypentyl methacrylate, 6-hydroxy-3-methylhexyl methacrylate, 5-hydroxyhexyl methacrylate, 3-hydroxy-2-t-butylpropyl methacrylate, 3-hydroxy-2,2-dimethylhexyl methacrylate, 3-hydroxy-2-methylethylpropyl methacrylate and 12-hydroxydodecyl methacrylate; and a residue (hereinafter referred to sometimes as an acrylate residue) obtainable by removing a hydrogen atom from the hydroxy group of an acrylate, such as 2-hydroxyethyl acrylate, 2-hydroxypropyl acrylate, 2-hydroxybutyl acrylate, 3-hydroxybutyl acrylate, 4-hydroxybutyl acrylate, 5-hydroxypentyl acrylate, 6-hydroxy-3-methylhexyl acrylate, 5-hydroxyhexyl acrylate, 3-hydroxy-2-t-butylpropyl acrylate, 3-hydroxy-2,2-dimethylhexyl acrylate, 3-hydroxy-2-methylethylpropyl acrylate and 12-hydroxydodecyl acrylate. Preferred are the 2-hydroxylethyl methacrylate residue and 2-hydroxylethyl acrylate residue.

As a result of comparison of a hydroxylalkyl methacrylate residue with a hydroxylalkyl acrylate residue, the hydroxylalkyl acrylate residue is more preferred in terms of the curing rate. The curable phosphazene compounds as represented by the Chemical formula (5) above may be one in which the reference symbol n is an integer of 3 or greater, preferably from 3 to 18, and, more preferably, a cyclic compound in which n is 3 or 4 or a mixture thereof.

The curable phosphazene compounds may be prepared by known processes. For instance, a reaction of hexachlorocyclotriphosphazene with 2-hydroxylethyl methacrylate yields a phosphazene compound in which a portion or all of the chlorine atoms of the hexachlorocyclotriphosphazene is substituted by the 2-hydroxylethyl methacrylate residue. In this case, it is preferred that all the chlorine atoms are substituted although it is possible that a portion of the chlorine atoms is left unsubstituted. In this reaction, it is advantageous to use a tertiary amine because it can facilitate the reaction of removing hydrogen chloride. Such a tertiary amine may include, for example, trimethyl amine, triethyl amine, triisopropyl amine, tri-n-propyl amine, tri-n-butyl amine and pyridine. Most preferred is pyridine.

The reaction may be carried out usually in an organic solvent which may include, for example, benzene, toluene, xylene, chloroform, cyclohexane, methylene chloride or tetrahydrofuran or a mixture thereof.

The chlorophosphazene compound to be used as a starting material for the preparation of the phosphazene compound may preferably include a trimer of dichlorophosphazene, i.e., hexachlorocyclotriphosphazene, teromer thereof, i.e., octachlorocyclotetraphosphazene, or an oligomer thereof, because the phosphazene compound obtained by using the trimer, teromer or oligomer thereof can readily control the cross-linkage density in the final electrolyte product (obtainable by curing the phosphazene compound).

The in situ curable resin composition according to some embodiments of the present disclosure contains the pentaerythritol acrylate compound and/or the bis(4-acryloxydialkoxyphenyl)alkane compound, on top of the curable phosphazene compound as have been described hereinabove. Examples of the pentaerythritol acrylate compounds include pentaerythritol triacrylate, dipentaerythritol hexaacrylate or dipentaerythritol monohydroxypentaacrylate. Among these compounds, pentaerythritol triacrylate, dipentaerythritol hexaacrylate, and dipentaerythritol monohydroxypentaacrylate are preferred. The pentaerythritol acrylate compound may be used singly or in combination thereof. Preferably, the pentaerythritol acrylate compound is a mixture of dipentaerythritol hexaacrylate with dipentaerythritol monohydroxypenataacrylate.

The pentaerythritol acrylate compound may be obtained, for example, by reacting pentaerithritol with acrylic acid. Furthermore, among these pentaerythritol acrylate compounds, it is preferred to use a mixture of the dipentaerythritol hexaacrylate containing 0.3 to 0.5 in mole of dipentaerythritol monohydroxypentaacrylate that is readily available, in terms of curability.

The curing agent may be preferably from, for example, a photopolymerization initiator such as 1-hydroxycyclohexylphenyl ketone, dibenzoyl, benzoyl methyl ether, benzoyl ethyl ether, p-chlorobenzophenone, p-methoxybenzophenone, benzoyl peroxide, di-tert.-butyl peroxide and camphaquinone. These curing agents may be used singly or in combination thereof. They may be used in an amount ranging usually from 0.05 parts to 10.0 parts by weight with respect to 100 parts by weight of the curable resin composition.

When the curable resin composition is cured by heating at elevated temperatures or cured at ambient temperatures, it is preferred to use a peroxide compound, an amine compound or a mixture thereof as a polymerization initiator. Representative examples of the peroxide compounds include benzoyl peroxide, P-chlorobenzoyl peroxide, 2,4-dichlorobenzoyl peroxide, t-butyl hydroperoxide, di-t-butyl peroxide, dicumyl peroxide, t-butyl peroxyacetate, diacetate or t-butyl peroxybenzoate. As representative examples of the amine compounds may be enumerated, for example, N,N-diethanol-p-toluidine, dimethyl-p-toluidine, p-toluidine, methyl amine, t-butyl amine, methylethyl amine, diphenyl amine, 4,4'-dinitrodiphenyl amine, o-nitroaniline, p-bromoaniline or 2,4,6-tribromoaniline. They may be used singly or in combination thereof and in an amount ranging usually from 0.05 parts to 10.0 parts by weight, preferably from 0.1 to 6.0 parts by weight, with respect to 100 parts by weight of the curable resin composition.

In certain preferred embodiments, the lithium salt is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethysulfonylimide (LiBETI), lithium bis(fluorosulphonyl)imide, an ionic liquid lithium salt, or a combination thereof.

The electrolyte may further comprise from 0.1% to 50% (preferably 1%-30%) by weight of a non-aqueous liquid solvent dispersed in the polyphosphazene polymer, based on the total weight of the lithium salt, the polyphosphazene polymer, and the non-aqueous liquid solvent combined. This liquid solvent, if present, is held in place between polymer chains and, hence, will not flow, leak, or easily vaporized.

The liquid solvent may be selected from a fluorinated carbonate, hydrofluoroether, fluorinated vinyl carbonate, fluorinated ester, fluorinated vinyl ester, fluorinated vinyl ether, sulfone, sulfide, nitrile, phosphate, phosphite, phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), an ionic liquid solvent, or a combination thereof.

It is uniquely advantageous to be able to polymerize the reactive phosphazene compound (or to conduct macromolecular substitution and/or cross-linking) once injected into a battery cell. With such a novel strategy, one can readily entrap the liquid solvent (if any) in the matrix of polymer chains or completely eliminate the liquid solvent all together. This approach also eliminates the problems of solid-state electrolyte's inability to wet the surfaces of electrode active materials and the challenges of incorporating a solid electrolyte into the battery once the polymer is fully polymerized. A liquid monomer or oligomer, or a solution containing a monomer, oligomer, or reactive polymer (capable of undergoing substitution, crosslinking, and/or co-polymerizing) dissolved therein acts to wet the anode active material or cathode active material before the monomer/oligomer is polymerized, substituted, crosslinked, or solvent is removed. This is of significant utility value since most of the organic solvents are known to be volatile and flammable, posing a fire and explosion danger.

Upon polymerization, substitution, and/or crosslinking, the electrolyte is a quasi-solid or substantially solid-state electrolyte that has the following highly desirable and advantageous features: (i) good electrolyte-electrode contact and interfacial stability (minimal solid electrode-electrolyte interfacial impedance) commonly enjoyed by a liquid electrolyte but not by a conventional solid-state electrolyte; (ii) good processibility and ease of battery cell production; (iii) highly resistant to flame and fire. The polymer preferably and typically comprises a polymer having a lithium ion conductivity typically from $10^{-8}$ S/cm to $10^{-2}$ S/cm at room temperature.

In certain embodiments, the rechargeable lithium cell comprises:
(a) a cathode having a cathode active material (along with an optional conductive additive and an optional resin binder) and an optional cathode current collector (such as Al foil) supporting the cathode active material;
(b) an anode having an anode current collector, with or without an anode active material supported on the anode current collector; (It may be noted that if no conventional anode active material, such as graphite, Si, SiO, Sn, and conversion-type anode materials, and no lithium metal is present in the cell when the cell is made and before the cell begins to charge and discharge, the battery cell is commonly referred to as an "anode-less" lithium cell.)
(c) an optional porous separator (or a lithium ion-permeable membrane) electronically separating the anode and the cathode; and
(d) an electrolyte, comprising a polyphosphazene polymer comprising chains derived from a phosphazene compound and a lithium salt dissolved or dispersed in the polymer.

In some preferred embodiments, the battery cell contains substantially no liquid solvent therein after the required chemical reactions (e.g. polymerization, substitution, and/or crosslinking) are completed. However, it is essential to initially include a liquid monomer, liquid oligomer, or liquid solvent in the cell (which has the monomer, oligomer, or reactive polymer dissolved therein), enabling the lithium salt to get dissociated into lithium ions and anions. A majority (>50%, preferably >70%) or substantially all of the liquid solvent (particularly the organic solvent) is then removed just before or after curing. With substantially 0% liquid solvent, the resulting electrolyte is a solid-state electrolyte. With less than 30% liquid solvent, we have a quasi-solid electrolyte. Both are highly flame-resistant.

The presence of this liquid solvent is designed to impart certain desired properties to the polymerized electrolyte, such as lithium-ion conductivity, flame retardancy, ability of the electrolyte to permeate into the electrode (anode and/or cathode) to properly wet the surfaces of the anode active material and/or the cathode active material.

Desirable liquid solvents (preferably having a melting point lower than 100° C., more preferably lower than 50° C., and most preferably lower than 25° C.) include fluorinated solvents; e.g., fluorinated vinyl carbonates, fluorinated esters, fluorinated vinyl esters, and fluorinated vinyl ethers. Fluorinated vinyl esters include R$_f$CO$_2$CH=CH$_2$ and Propenyl Ketones, R$_f$COCH=CHCH$_3$, where R$_f$ is F or any F-containing functional group (e.g., CF$_2$— and CF$_2$CF$_3$—).

Two examples of fluorinated vinyl carbonates are given below:

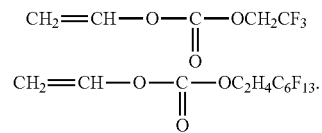

In some embodiments, the fluorinated carbonate is selected from fluoroethylene carbonate (FEC), DFDMEC, FNPEC, hydrofluoro ether (HFE), trifluoro propylene carbonate (FPC), or methyl nonafluorobutyl ether (MFE), wherein the chemical formulae for FEC, DFDMEC, and FNPEC, respectively are shown below:

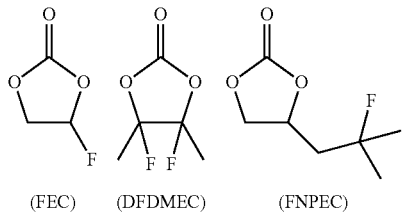

(FEC)   (DFDMEC)   (FNPEC)

Desirable sulfones as a liquid solvent include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone,

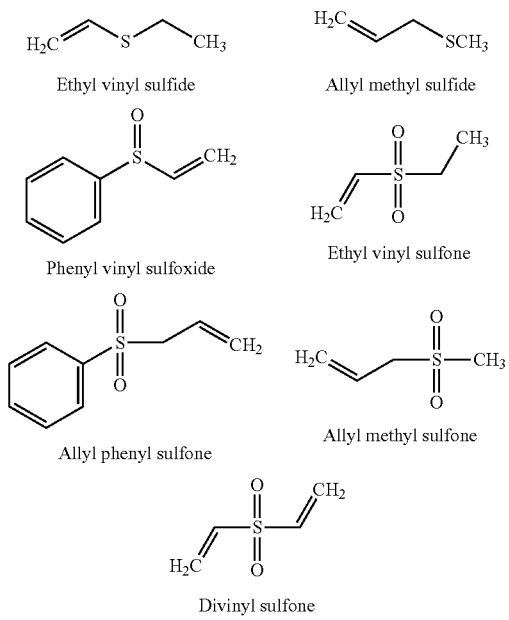

In certain embodiments, the sulfone as a liquid solvent is selected from TrMS, MTrMS, TMS, or vinyl or double bond-containing variants of TrMS, MTrMS, TMS, EMS, MMES, EMES, EMEES, or a combination thereof; their chemical formulae being given below:

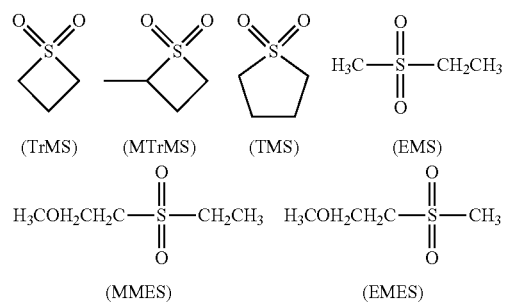

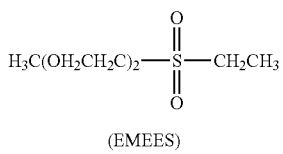

(EMEES)

The nitrile as a liquid solvent or as an additive to a liquid solvent may be selected from a dinitrile, such as AND, GLN, SEN, or a combination thereof and their chemical formulae are given below:

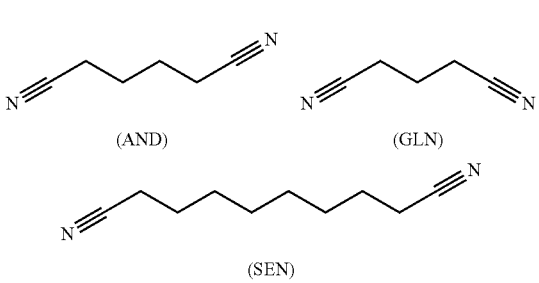

In some embodiments, the liquid solvent is selected from phosphate, alkyl phosphonate, phosphazene, phosphite, or sulfate; e.g., tris(trimethylsilyl) phosphite (TTSPi), alkyl phosphate, triallyl phosphate (TAP), ethylene sulfate (DTD), a combination thereof, or a combination with 1,3-propane sultone (PS) or propene sultone (PES). The phosphate, alkyl phosphonate, or phosphazene may be selected from the following:

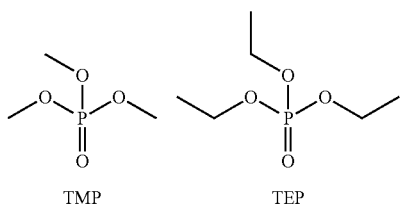

TMP   TEP

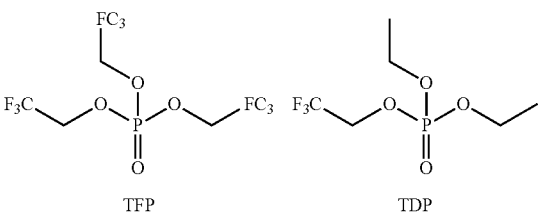

TFP   TDP

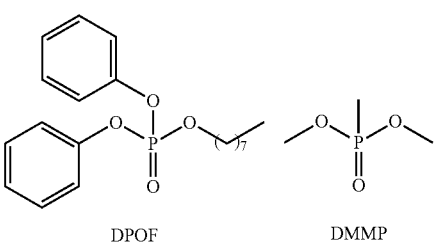

DPOF   DMMP

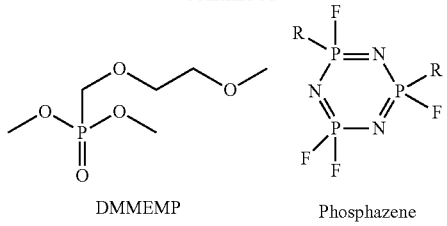
DMMEMP

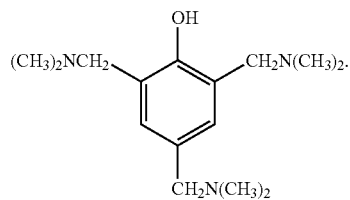
Phosphazene wherein R=H, NH$_2$, or C$_1$-C$_6$ alkyl.

The disclosed electrolyte may be initially in a reactive liquid electrolyte composition form, comprising a lithium salt and an initiator, a substituent, a co-monomer, or a crosslinking agent dissolved or dispersed in a reactive liquid medium comprising a reactive phosphazene compound (monomer, oligomer, or reactive polymer).

In certain preferred embodiments, the electrolyte composition comprises: (a) a first solution, comprising the reactive phosphazene compound which is in a liquid state or is dissolved in a first non-aqueous liquid solvent; and (b) a second solution, comprising an initiator (including catalyst, accelerator, promoter, etc., where needed), substituent, or crosslinking agent, a lithium salt, and a second non-aqueous liquid solvent; wherein the first solution and the second solution are stored separately before the first solution and the second solution are mixed to form an electrolyte. The first non-aqueous liquid solvent may be the same as or different than the second non-aqueous liquid solvent.

The reactive liquid electrolyte composition may further comprise a curing agent (a crosslinking agent or co-polymerization monomer) selected from an amide group, such as N,N-dimethylacetamide, N,N-diethylacetamide, N,N-dimethylformamide, N,N-diethylformamide, or a combination thereof. In some embodiments, the crosslinking agent may comprise a compound having at least one reactive group selected from a hydroxyl group, an amino group, an imino group, an amide group, an acrylic amide group, an amine group, an acrylic group, an acrylic ester group, or a mercapto group in the molecule. In certain embodiments, the crosslinking agent is selected from a phenylene group, poly(diethanol) diacrylate, poly(ethyleneglycol) dimethacrylate, poly(diethanol) dimethylacrylate, or poly(ethylene glycol) diacrylate.

The initiator or a co-initiator may be selected from an azo compound (e.g., azodiisobutyronitrile, AIBN), azobisisobutyronitrile, azobisisoheptonitrile, dimethyl azobisisobutyrate, perfluoroalkyl iodide (C$_6$F$_{13}$I), benzoyl peroxide tert-butyl peroxide and methyl ethyl ketone peroxide, benzoyl peroxide (BPO), bis(4-tert-butylcyclohexyl) peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile), benzoylperoxide (BPO), hydrogen peroxide, dodecamoyl peroxide, isobutyryl peroxide, cumene hydroperoxide, tert-butyl peroxypivalate, diisopropyl peroxydicarbonate, or a combination thereof.

The initiator may be selected from PCl$_5$, n-C$_4$H$_9$Li, (C$_5$H$_5$)$_2$Mg, (i-C$_4$H$_9$)$_3$Al, a carbenium salt, CF$_3$SO$_3$CH$_3$, CF$_3$SO$_3$C$_2$H$_5$, (CF$_3$SO$_2$)O, Ph$_3$C$^+$AsF$_6^-$, a lithium salt, or a combination thereof. The initiator may comprise a lithium salt selected from lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), or a combination thereof. In other words, we have surprisingly observed that certain lithium salts actually participate in the polymerization reactions.

The crosslinking agent preferably comprises a compound having at least one reactive group selected from a hydroxyl group, an amino group, an imino group, an amide group, an amine group, an acrylic group, or a mercapto group in the molecule. The amine group is preferably selected from the following structure:

$$\begin{array}{c} \text{OH} \\ (CH_3)_2NCH_2 \!-\!\!\!\!\bigcirc\!\!\!\!-\! CH_2N(CH_3)_2 \\ | \\ CH_2N(CH_3)_2 \end{array}$$

The crosslinking agent may be selected from a phenylene group, N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid (Formula 4 below), acrylic acid, methacrylic acid, a derivative compound of acrylic acid, a derivative compound of methacrylic acid (e.g. polyhydroxyethylmethacrylate), glycidyl functions, N,N'-Methylenebisacrylamide (MBAAm), Ethylene glycol dimethacrylate (EGDMAAm), isobornyl methacrylate, poly (acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate (e.g. methylene diphenyl diisocyanate, MDI), an urethane chain, a chemical derivative thereof, or a combination thereof.

The electrolyte may further comprise a flame-retardant additive, different in composition than the liquid solvent. Flame-retardant additives are intended to inhibit or stop polymer pyrolysis and electrolyte combustion processes by interfering with the various mechanisms involved—heating, ignition, and propagation of thermal degradation.

The flame-retardant additive may be selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

There is no limitation on the type of flame retardant that can be physically or chemically, incorporated into the elastic polymer. The main families of flame retardants are based on compounds containing: Halogens (Bromine and Chlorine), Phosphorus, Nitrogen, Intumescent Systems, Minerals (based on aluminum and magnesium), and others (e.g., Borax, Sb$_2$O$_3$, and nanocomposites). Antimony trioxide is a good choice, but other forms of antimony such as the pentoxide and sodium antimonate may also be used.

One may use the reactive types (being chemically bonded to or becoming part of the polymer structure) and additive types (simply dispersed in the polymer matrix). For instance, reactive polysiloxane can chemically react with EPDM type elastic polymer and become part of the crosslinked network polymer. It may be noted that flame-retarding group modified polysiloxane itself is an elastic polymer composite containing a flame retardant according to an embodiment of instant disclosure. Both reactive and additive types of flame retardants can be further separated into several different classes:

1) Minerals: Examples include aluminum hydroxide (ATH), magnesium hydroxide (MDH), huntite and hydromagnesite, various hydrates, red phosphorus and boron compounds (e.g. borates).
2) Organo-halogen compounds: This class includes organochlorines such as chlorendic acid derivatives and chlorinated paraffins; organobromines such as decabromodiphenyl ether (decaBDE), decabromodiphenyl ethane (a replacement for decaBDE), polymeric brominated compounds such as brominated polystyrenes, brominated carbonate oligomers (BCOs), brominated epoxy oligomers (BEOs), tetrabromophthalic anyhydride, tetrabromobisphenol A (TBBPA), and hexabromocyclododecane (HBCD).
3) Organophosphorus compounds: This class includes organophosphates such as triphenyl phosphate (TPP), resorcinol bis(diphenylphosphate) (RDP), bisphenol A diphenyl phosphate (BADP), and tricresyl phosphate (TCP); phosphonates such as dimethyl methylphosphonate (DMMP); and phosphinates such as aluminum diethyl phosphinate. In one important class of flame retardants, compounds contain both phosphorus and a halogen. Such compounds include tris(2,3-dibromopropyl) phosphate (brominated tris) and chlorinated organophosphates such as tris(1,3-dichloro-2-propyl) phosphate (chlorinated tris or TDCPP) and tetrakis(2-chloroethyl) dichloroisopentyldiphosphate (V6).
4) Organic compounds such as carboxylic acid and dicarboxylic acid The mineral flame retardants mainly act as additive flame retardants and do not become chemically attached to the surrounding system (the polymer). Most of the organohalogen and organophosphate compounds also do not react permanently to attach themselves into the polymer. Certain new non halogenated products, with reactive and non-emissive characteristics have been commercially available as well.

In certain embodiments, the flame-retardant additive is in a form of encapsulated particles comprising the additive encapsulated by a shell of coating material that is breakable or meltable when exposed to a temperature higher than a threshold temperature (e.g., flame or fire temperature induced by internal shorting). The encapsulating material is a substantially lithium ion-impermeable and liquid electrolyte-impermeable coating material. The encapsulating or micro-droplet formation processes The flame-retardant additive-to-liquid solvent ratio in the mixture is from 1/95 to 99/1 by weight, preferably from 10/85 to 80/20 by weight, further preferably from 20/80 to 70/20 by weight, and most preferably from 35/65 to 65/35 by weight.

In certain desirable embodiments, the electrolyte further comprises particles of an inorganic solid electrolyte material having a particle size from 2 nm to 30 μm, wherein the particles of inorganic solid electrolyte material are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

The inorganic solid electrolytes that can be incorporated into an elastic polymer protective layer include, but are not limited to, perovskite-type, NASICON-type, garnet-type and sulfide-type materials. A representative and well-known perovskite solid electrolyte is $Li_{3x}La_{2/3-x}TiO_3$, which exhibits a lithium-ion conductivity exceeding $10^{-3}$ S/cm at room temperature. This material has been deemed unsuitable in lithium batteries because of the reduction of $Ti^{4+}$ on contact with lithium metal. However, we have found that this material, when dispersed in an elastic polymer, does not suffer from this problem.

The sodium superionic conductor (NASICON)-type compounds include a well-known $Na_{1+x}Zr_2Si_xP_{3-x}O_{12}$. These materials generally have an $AM_2(PO_4)_3$ formula with the A site occupied by Li, Na or K. The M site is usually occupied by Ge, Zr or Ti. In particular, the $LiTi_2(PO_4)_3$ system has been widely studied as a solid state electrolyte for the lithium-ion battery. The ionic conductivity of $LiZr_2(PO_4)_3$ is very low, but can be improved by the substitution of Hf or Sn. This can be further enhanced with substitution to form $Li_{1+x}M_x Ti_{2-x}(PO_4)_3$ (M=Al, Cr, Ga, Fe, Sc, In, Lu, Y or La). Al substitution has been demonstrated to be the most effective solid state electrolyte. The $Li_{1+x}Al_xGe_{2-x}(PO_4)_3$ system is also an effective solid state due to its relatively wide electrochemical stability window. NASICON-type materials are considered as suitable solid electrolytes for high-voltage solid electrolyte batteries.

Garnet-type materials have the general formula $A_3B_2Si_3O_{12}$, in which the A and B cations have eightfold and sixfold coordination, respectively. In addition to $Li_3M_2Ln_3O_2$ (M=W or Te), a braod series of garnet-type materials may be used as an additive, including $Li_5La_3M_2O_{12}$ (M=Nb or Ta), $Li_6ALa_2M_2O_{12}$ (A=Ca, Sr or Ba; M=Nb or Ta), $Li_{5.5}La_3M_{1.75}B_{0.25}O_{12}$ (M=Nb or Ta; B=In or Zr) and the cubic systems $Li_7La_3Zr_2O_{12}$ and $Li_{7.06}M_3Y_{0.06}Zr_{194}O_{12}$ (M=La, Nb or Ta). The $Li_{6.5}La_3Zr_{1.75}Te_{0.25}O_{12}$ compounds have a high ionic conductivity of $1.02\times10^{-3}$ S/cm at room temperature.

The sulfide-type solid electrolytes include the $Li_2S$—$SiS_2$ system. The highest reported conductivity in this type of material is $6.9\times10^{-4}$ S/cm, which was achieved by doping the $Li_2S$—$SiS_2$ system with $Li_3PO_4$. The sulfide type also includes a class of thio-LISICON (lithium superionic conductor) crystalline material represented by the $Li_2S$—$P_2S_5$ system. The chemical stability of the $Li_2S$—$P_2S_5$ system is considered as poor, and the material is sensitive to moisture (generating gaseous $H_2S$). The stability can be improved by the addition of metal oxides. The stability is also significantly improved if the $Li_2S$–$P_2S_5$ material is dispersed in an elastic polymer.

These solid electrolyte particles dispersed in an electrolyte polymer can help enhance the lithium ion conductivity of certain polymers having an intrinsically low ion conductivity.

Preferably and typically, the polymer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm.

The disclosed lithium battery can be a lithium-ion battery or a lithium metal battery, the latter having lithium metal as the primary anode active material. The lithium metal battery can have lithium metal implemented at the anode when the cell is made. Alternatively, the lithium may be stored in the cathode active material and the anode side is lithium metal-free initially. This is called an anode-less lithium metal battery.

As illustrated in FIG. 2(A), the anode-less lithium cell is in an as-manufactured or fully discharged state according to certain embodiments of the present disclosure. The cell comprises an anode current collector 12 (e.g., Cu foil), a separator, a cathode layer 16 comprising a cathode active material, an optional conductive additive (not shown), an optional resin binder (not shown), and an electrolyte (dispersed in the entire cathode layer and in contact with the cathode active material), and a cathode current collector 18 that supports the cathode layer 16. There is no lithium metal in the anode side when the cell is manufactured.

In a charged state, as illustrated in FIG. 2(B), the cell comprises an anode current collector 12, lithium metal 20 plated on a surface (or two surfaces) of the anode current collector 12 (e.g., Cu foil), a separator 15, a cathode layer 16, and a cathode current collector 18 supporting the cathode layer. The lithium metal comes from the cathode active material (e.g., $LiCoO_2$ and $LiMn_2O_4$) that contains Li element when the cathode is made. During a charging step, lithium ions are released from the cathode active material and move to the anode side to deposit onto a surface or both surfaces of an anode current collector.

One unique feature of the presently disclosed anode-less lithium cell is the notion that there is substantially no anode active material and no lithium metal is present when the battery cell is made. The commonly used anode active material, such as an intercalation type anode material (e.g., graphite, carbon particles, Si, SiO, Sn, $SnO_2$, Ge, etc.), P, or any conversion-type anode material, is not included in the cell. The anode only contains a current collector or a protected current collector. No lithium metal (e.g., Li particle, surface-stabilized Li particle, Li foil, Li chip, etc.) is present in the anode when the cell is made; lithium is basically stored in the cathode (e.g., Li element in $LiCoO_2$, $LiMn_2O_4$, lithium iron phosphate, lithium polysulfides, lithium polyselenides, etc.). During the first charge procedure after the cell is sealed in a housing (e.g., a stainless steel hollow cylinder or an Al/plastic laminated envelop), lithium ions are released from these Li-containing compounds (cathode active materials) in the cathode, travel through the electrolyte/separator into the anode side, and get deposited on the surfaces of an anode current collector. During a subsequent discharge procedure, lithium ions leave these surfaces and travel back to the cathode, intercalating or inserting into the cathode active material.

Such an anode-less cell is much simpler and more cost-effective to produce since there is no need to have a layer of anode active material (e.g., graphite particles, along with a conductive additive and a binder) pre-coated on the Cu foil surfaces via the conventional slurry coating and drying procedures. The anode materials and anode active layer manufacturing costs can be saved. Furthermore, since there is no anode active material layer (otherwise typically 40-200 μm thick), the weight and volume of the cell can be significantly reduced, thereby increasing the gravimetric and volumetric energy density of the cell.

Another important advantage of the anode-less cell is the notion that there is no lithium metal in the anode when a lithium metal cell is made. Lithium metal (e.g., Li metal foil and particles) is highly sensitive to air moisture and oxygen and notoriously known for its difficulty and danger to handle during manufacturing of a Li metal cell. The manufacturing facilities should be equipped with special class of dry rooms, which are expensive and significantly increase the battery cell costs.

The anode current collector may be selected from a foil, perforated sheet, or foam of Cu, Ni, stainless steel, Al, graphene, graphite, graphene-coated metal, graphite-coated metal, carbon-coated metal, or a combination thereof. Preferably, the current collector is a Cu foil, Ni foil, stainless steel foil, graphene-coated Al foil, graphite-coated Al foil, or carbon-coated Al foil.

The anode current collector typically has two primary surfaces. Preferably, one or both of these primary surfaces is deposited with multiple particles or coating of a lithium-attracting metal (lithiophilic metal), wherein the lithium-attracting metal, preferably having a diameter or thickness from 1 nm to 10 μm, is selected from Au, Ag, Mg, Zn, Ti, K, Al, Fe, Mn, Co, Ni, Sn, V, Cr, an alloy thereof, or a combination thereof. This deposited metal layer may be further deposited with a layer of graphene that covers and protects the multiple particles or coating of the lithiophilic metal.

The graphene layer may comprise graphene sheets selected from single-layer or few-layer graphene, wherein the few-layer graphene sheets are commonly defined to have 2-10 layers of stacked graphene planes having an inter-plane spacing $d_{002}$ from 0.3354 nm to 0.6 nm as measured by X-ray diffraction. The single-layer or few-layer graphene sheets may contain a pristine graphene material having essentially zero % of non-carbon elements, or a non-pristine graphene material having 0.001% to 45% by weight of non-carbon elements. The non-pristine graphene may be selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

The graphene layer may comprise graphene balls and/or graphene foam. Preferably, the graphene layer has a thickness from 1 nm to 50 μm and/or has a specific surface area from 5 to 1000 $m^2/g$ (more preferably from 10 to 500 $m^2/g$).

For a lithium-ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

Another surprising and of tremendous scientific and technological significance is our discovery that the flammability of any volatile organic solvent can be effectively suppressed provided that a sufficiently high amount of a lithium salt and polymer is added to and dissolved in this organic solvent to form a solid-like or quasi-solid electrolyte (e.g., first electrolyte in the cathode). In general, such a quasi-solid electrolyte exhibits a vapor pressure less than 0.01 kPa and often less than 0.001 kPa (when measured at 20° C.) and less than 0.1 kPa and often less than 0.01 kPa (when measured at 100° C.). (The vapor pressures of the corresponding neat solvent, without any lithium salt dissolved therein, are typically significantly higher.) In many cases, the vapor molecules are practically too few to be detected.

A highly significant observation is that the polymer derived (polymerized) from a phosphazene compound can dramatically curtail the amount of volatile solvent molecules that can escape into the vapor phase in a thermodynamic equilibrium condition. In many cases, this has effectively prevented any flammable gas molecules from initiating a flame even at an extremely high temperature. The flash point of the quasi-solid or solid-state electrolyte is typically at least 100 degrees (often >150 degrees) higher than the flash point of the neat organic solvent without polymerization. In most of the cases, either the flash point is significantly higher than 200° C. or no flash point can be detected. The electrolyte just would not catch on fire. Furthermore, any accidentally initiated flame does not sustain for longer than 3 seconds. This is a highly significant discovery, considering the notion that fire and explosion concern has been a major impediment to widespread acceptance of battery-powered electric vehicles. This new technology could significantly impact the emergence of a vibrant EV industry.

In addition to the non-flammability and high lithium ion transference numbers, there are several additional benefits associated with using the presently disclosed quasi-solid or solid-state electrolytes. As one example, these electrolytes can significantly enhance cycling and safety performance of rechargeable lithium batteries through effective suppression of lithium dendrite growth. Due to a good contact between the electrolyte and an electrode, the interfacial impedance can be significantly reduced. Additionally, the local high viscosity induced by presence of a polymer can increase the pressure from the electrolyte to inhibit dendrite growth, potentially resulting in a more uniform deposition of lithium ions on the surface of the anode. The high viscosity could also limit anion convection near the deposition area, promoting more uniform deposition of Li ions. These reasons, separately or in combination, are believed to be responsible for the notion that no dendrite-like feature has been observed with any of the large number of rechargeable lithium cells that we have investigated thus far.

As another benefit example, this electrolyte is capable of inhibiting lithium polysulfide dissolution at the cathode and migration to the anode of a Li—S cell, thus overcoming the polysulfide shuttle phenomenon and allowing the cell capacity not to decay significantly with time. Consequently, a coulombic efficiency nearing 100% along with long cycle life can be achieved. When a concentrated electrolyte and a crosslinked polymer is used, the solubility of lithium polysulfide will be reduced significantly.

The lithium salt dispersed in the polymer electrolyte may comprise an ionic liquid lithium salt, or a combination thereof. The ionic liquid is composed of ions only. Ionic liquids are low melting temperature salts that are in a molten or liquid state when above a desired temperature. For instance, an ionic salt is considered as an ionic liquid if its melting point is below 100° C. If the melting temperature is equal to or lower than room temperature (25° C.), the salt is referred to as a room temperature ionic liquid (RTIL). The IL-based lithium salts are characterized by weak interactions, due to the combination of a large cation and a charge-delocalized anion. This results in a low tendency to crystallize due to flexibility (anion) and asymmetry (cation).

Some ILs may be used as a co-solvent (not as a salt) to work with the first organic solvent of the present disclosure. A well-known ionic liquid is formed by the combination of a 1-ethyl-3-methyl-imidazolium (EMI) cation and an N,N-bis(trifluoromethane)sulphonamide (TFSI) anion. This combination gives a fluid with an ionic conductivity comparable to many organic electrolyte solutions, a low decomposition propensity and low vapor pressure up to ~300-400° C. This implies a generally low volatility and non-flammability and, hence, a much safer electrolyte solvent for batteries.

Ionic liquids are basically composed of organic or inorganic ions that come in an unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide and hexafluorophosphate as anions. Useful ionic liquid-based lithium salts (not solvent) may be composed of lithium ions as the cation and bis(trifluoromethanesulphonyl)imide, bis(fluorosulphonyl)imide and hexafluorophosphate as anions. For instance, lithium trifluoromethanesulfonimide (LiTFSI) is a particularly useful lithium salt.

Based on their compositions, ionic liquids come in different classes that include three basic types: aprotic, protic and zwitterionic types, each one suitable for a specific application. Common cations of room temperature ionic liquids (RTILs) include, but are not limited to, tetraalkylammonium, di, tri, and tetra-alkylimidazolium, alkylpyridinium, dialkyl-pyrrolidinium, dialkylpiperidinium, tetraalkylphosphonium, and trialkylsulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte co-solvent in a rechargeable lithium cell.

There is also no restriction on the type of the cathode materials that can be used in practicing the present disclosure. For Li—S cells, the cathode active material may contain lithium polysulfide or sulfur. If the cathode active material includes lithium-containing species (e.g., lithium polysulfide) when the cell is made, there is no need to have a lithium metal pre-implemented in the anode.

There are no particular restrictions on the types of cathode active materials that can be used in the presently disclosed lithium battery, which can be a primary battery or a secondary battery. The rechargeable lithium metal or lithium-ion cell may preferably contain a cathode active material selected from, as examples, a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In a rechargeable lithium cell, the cathode active material may be selected from a metal oxide, a metal oxide-free inorganic material, an organic material, a polymeric material, sulfur, lithium polysulfide, selenium, or a combination thereof. The metal oxide-free inorganic material may be selected from a transition metal fluoride, a transition metal chloride, a transition metal dichalcogenide, a transition metal trichalcogenide, or a combination thereof. In a particularly useful embodiment, the cathode active material is selected from $FeF_3$, $FeCl_3$, $CuCl_2$, $TiS_2$, $TaS_2$, $MoS_2$, $NbSe_3$, $MnO_2$, $CoO_2$, an iron oxide, a vanadium oxide, or a combination thereof, if the anode contains lithium metal as the anode active material. The vanadium oxide may be preferably selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. For those cathode active materials containing no Li element therein, there should be a lithium source implemented in the cathode side to begin with. This can be any compound that contains a high lithium content, or a lithium metal alloy, etc.

In a rechargeable lithium cell (e.g., the lithium-ion battery cell), the cathode active material may be selected to contain a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

Particularly desirable cathode active materials comprise lithium nickel manganese oxide ($LiNi_aMn_{2-a}O_4$, $0<a<2$), lithium nickel manganese cobalt oxide ($LiNi_nMn_mCo_{1-n-m}O_2$, $0<n<1$, $0<m<1$, $n+m<1$), lithium nickel cobalt aluminum oxide ($LiNi_cCo_dAl_{1-c-d}O_2$, $0<c<1$, $0<d<1$, $c+d<1$), lithium manganate ($LiMn_2O_4$), lithium iron phosphate ($LiFePO_4$), lithium manganese oxide ($LiMnO_2$), lithium cobalt oxide ($LiCoO_2$), lithium nickel cobalt oxide ($LiNi_pCo_{1-p}O_2$, $0<p<1$), or lithium nickel manganese oxide ($LiNi_qMn_{2-q}O_4$, $0<q<2$).

In a preferred lithium metal secondary cell, the cathode active material preferably contains an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof. Again, for those cathode active materials containing no Li element therein, there should be a lithium source implemented in the cathode side to begin with.

In another preferred rechargeable lithium cell (e.g., a lithium metal secondary cell or a lithium-ion cell), the cathode active material contains an organic material or polymeric material selected from Poly(anthraquinonyl sulfide) (PAQS), lithium oxocarbons (including squarate, croconate, and rhodizonate lithium salts), oxacarbon (including quinines, acid anhydride, and nitrocompound), 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material (redox-active structures based on multiple adjacent carbonyl groups (e.g., "$C_6O_6$"-type structure, oxocarbons), Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)6), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer may be selected from Poly[methanetetryl-tetra(thiomethylene)] (PMTTM), Poly(2,4-dithiopentanylene) (PDTP), or Poly(ethene-1,1,2,2-tetrathiol) (PETT) as a main-chain thioether polymer, in which sulfur atoms link carbon atoms to form a polymeric backbones. The side-chain thioether polymers have polymeric main-chains that consist of conjugating aromatic moieties, but having thioether side chains as pendants. Among them Poly(2-phenyl-1,3-dithiolane) (PPDT), Poly(1,4-di(1,3-dithiolan-2-yl)benzene) (PDDTB), poly(tetrahydrobenzodithiophene) (PTHBDT), and poly[1,2,4,5-tetrakis(propylthio)benzene] (PTKPTB) have a polyphenylene main chain, linking thiolane on benzene moieties as pendants. Similarly, poly[3,4(ethylenedithio)thiophene] (PEDTT) has polythiophene backbone, linking cyclo-thiolane on the 3,4-position of the thiophene ring.

In yet another preferred rechargeable lithium cell, the cathode active material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. This class of lithium secondary batteries has a high capacity and high energy density. Again, for those cathode active materials containing no Li element therein, there should be a lithium source implemented in the cathode side to begin with.

Figure 1B:
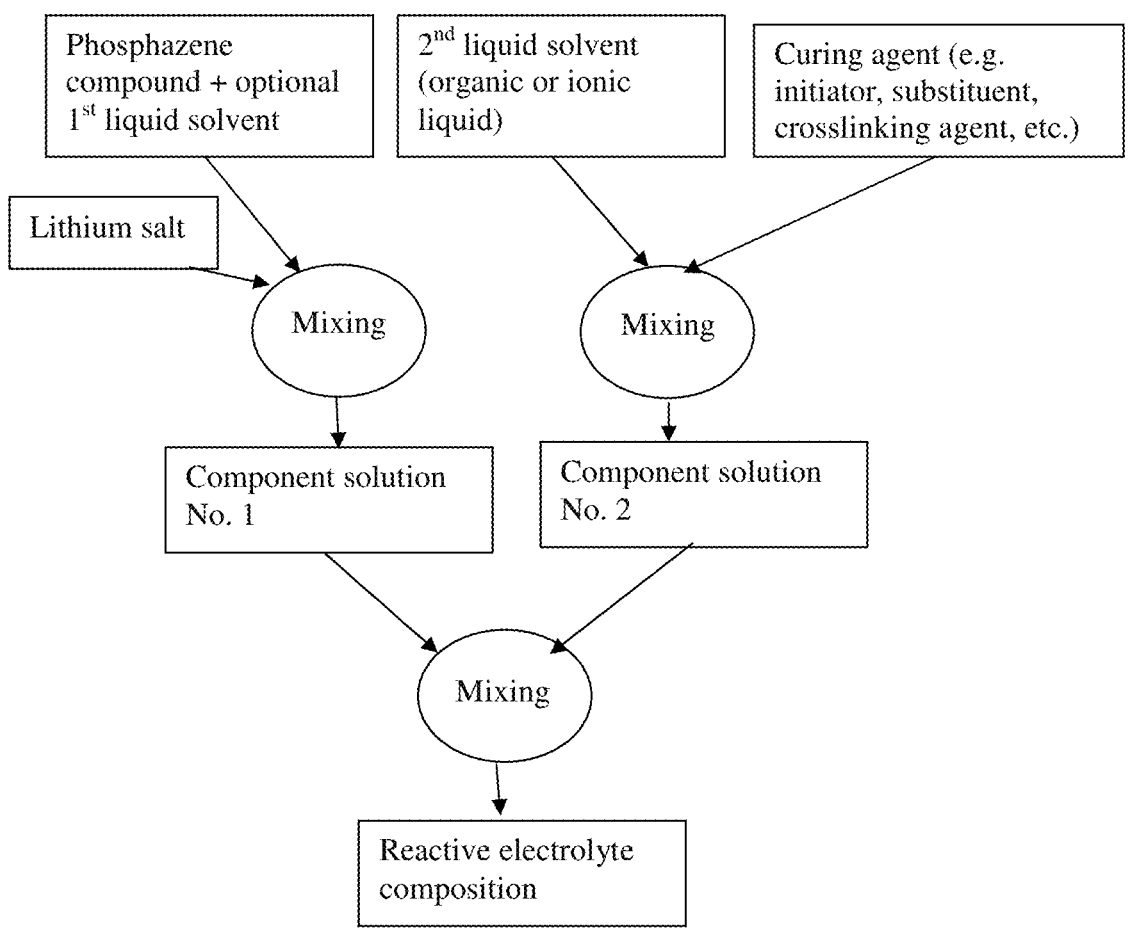
FIG. 1(B) A process flow chart to illustrate the method of producing a reactive electrolyte composition according to some embodiments of the present disclosure.

As illustrated in FIG. 1(B), the present disclosure also provides an electrolyte composition comprising: (a) a first solution, comprising at least a phosphazene compound (e.g. a monomer, oligomer, or reactive polymer) in a liquid state or dissolved in a first non-aqueous solvent; and (b) a second solution, comprising a curing agent (e.g., an initiator, a substituent, and/or a crosslinking agent), a lithium salt, and a second non-aqueous liquid solvent (e.g., an organic solvent or ionic liquid solvent); wherein the first solution and the second solution are stored separately before the first solution and the second solution are mixed to form the electrolyte. Actually, the lithium salt may be dissolved in the first solvent, the second solvent, or both.

The disclosure further provides a method of producing a rechargeable lithium cell (as illustrated in FIG. 1(A)), the method comprising: (a) providing a cathode; (b) providing an anode; (c) combining the cathode and the anode to form a dry cell; and (d) introducing (e.g., injecting) the presently disclosed reactive electrolyte composition into the dry cell and curing (polymerizing, substituting, and/or crosslinking) the reactive electrolyte composition to produce the rechargeable lithium cell. Step (d) may comprise partially or totally removing any un-polymerized or residual liquid solvent.

In this method, step (a) may be selected from any commonly used cathode production process. For instance, the process may include (i) mixing particles of a cathode active material, a conductive additive, an optional resin binder, optional particles of a solid inorganic electrolyte powder, and an optional flame retardant in a liquid medium (e.g., an organic solvent, such as NMP) to form a slurry; and (ii)

coating the slurry on a cathode current collector (e.g., an Al foil) and removing the solvent. The anode in step (b) may be produced in a similar manner, but using particles of an anode active material (e.g., particles of Si, SiO, Sn, $SnO_2$, graphite, and carbon). The liquid medium used in the production of an anode may be water or an organic solvent. Step (c) may entail combining the anode, a porous separator, the cathode, along with their respective current collectors, to form a unit cell which is enclosed in a protective housing to form a dry cell.

Figure 1C:
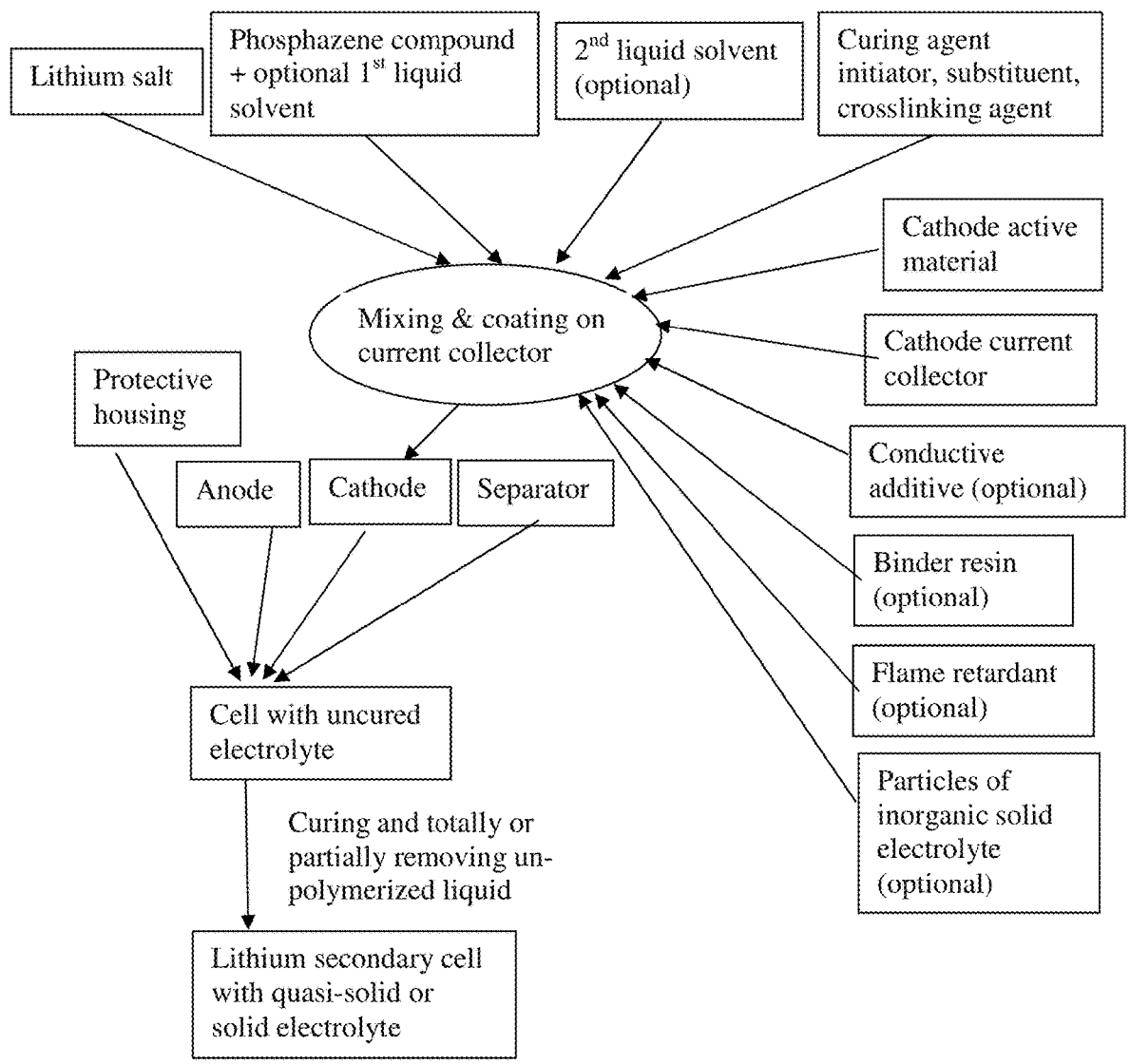
FIG. 1(C) A process flow chart to illustrate a method of producing a lithium metal battery comprising a substantially solid-state electrolyte according to some embodiments of the present disclosure.

As illustrated in FIG. 1(C), the disclosure also provides a method of producing the disclosed rechargeable lithium cell, the method comprising: (A) mixing particles of a cathode active material, an optional conductive additive (typically required in the cathode), an optional binder (optional but not required since, upon polymerization and/or crosslinking, the reactive additive becomes a binder that bonds the solid particles in the electrode together), an optional flame retardant, optional particles of an inorganic solid electrolyte powder, a reactive additive, and a lithium salt to form a cathode, wherein the reactive additive comprises at least a reactive phosphazene compound and a curing agent; (B) providing an anode; (C) combining the cathode and the anode to form a cell; and (D) polymerizing and/or cross-linking the reactive additive, prior to or after step (C), to produce the rechargeable lithium cell.

In step (A), particles of a cathode active material, an optional conductive additive, an optional binder, an optional flame retardant, a lithium salt, and optional particles of an inorganic solid electrolyte powder may be dissolved or dispersed in a reactive additive (containing at least a phosphazene compound) to form a slurry. The slurry is attached to or coated on a primary surface or both primary surfaces of a cathode current collector (e.g., Al foil) to form a cathode.

In certain embodiments, step (B) comprises a procedure of mixing particles of an anode active material, an optional conductive additive (not required if the anode active material is a carbon or graphite material), an optional binder (not required since, upon polymerization and/or crosslinking, the reactive additive becomes a binder that bonds the solid particles in the electrode together), an optional flame retardant, optional particles of an inorganic solid electrolyte powder, a reactive additive (the same or different reactive as used in the cathode, and a lithium salt to form an anode.

The method may further comprise polymerizing and/or crosslinking the reactive additive, prior to or after step (C), to produce the rechargeable lithium cell. Although FIG. 1(C) indicates that curing occurs after the cell is made according to certain embodiments of the present disclosure, curing of the reactive electrolyte composition can occur right after the electrode (anode or cathode) is made.

In some embodiments, step (A) further comprises adding particles of an inorganic solid electrolyte powder in the cathode. Step (B) may further comprise adding particles of an inorganic solid electrolyte powder in the anode.

Figure 1D:
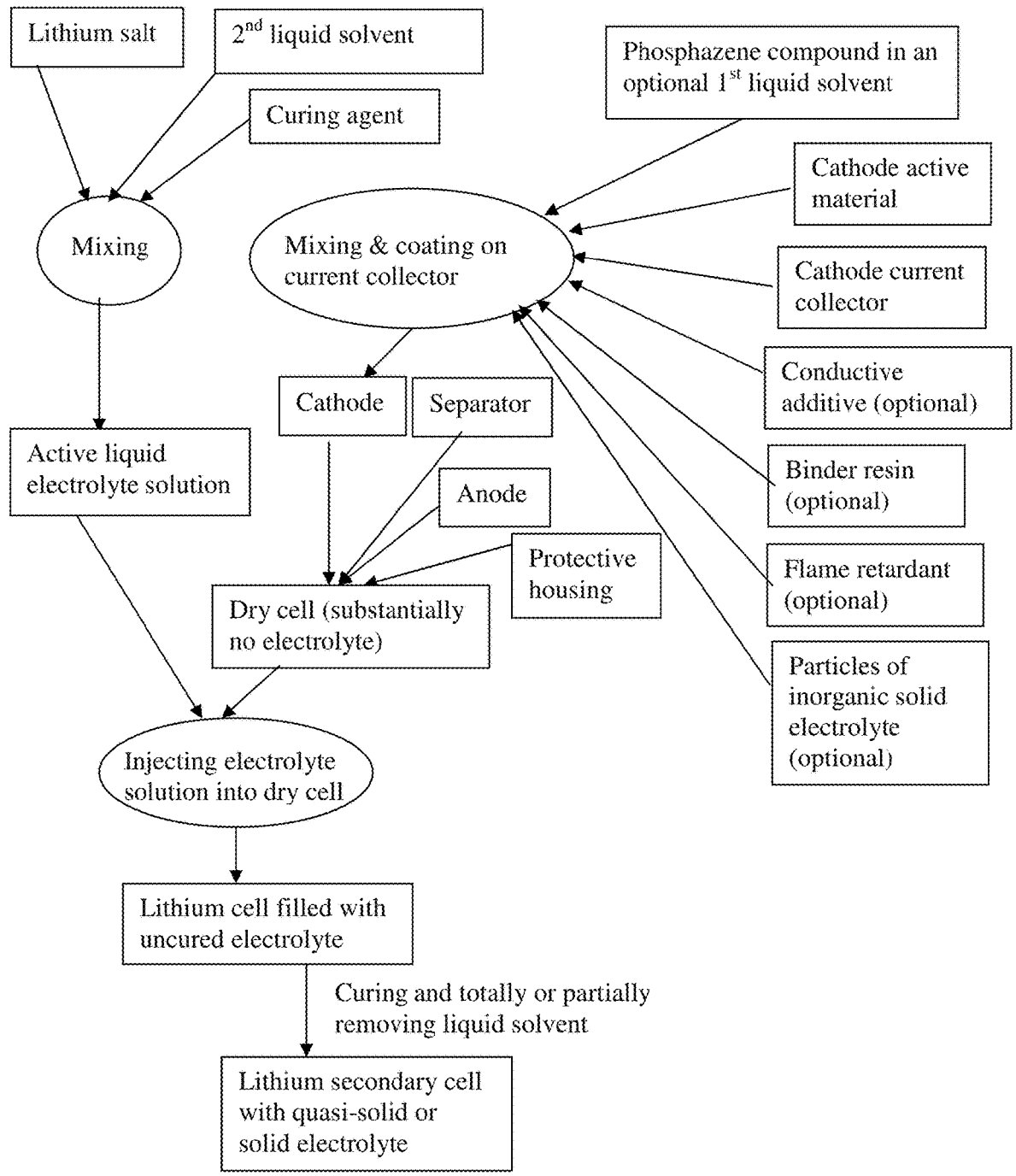
FIG. 1(D) A process flow chart to illustrate a method of producing a lithium metal battery comprising a substantially solid-state electrolyte according to some embodiments of the present disclosure.

Illustrated in FIG. 1(D) is yet another embodiment of the present disclosure, which is a method of producing the disclosed rechargeable lithium cell. The method comprises: (A) mixing particles of a cathode active material, an optional conductive additive (typically required in the cathode), an optional binder (not required since the reactive additive becomes a binder upon polymerization and/or crosslinking), an optional flame retardant, optional particles of an inorganic solid electrolyte powder, and a reactive additive to form a cathode (preferably containing at least one cathode active material layer supported on a current collector), wherein the reactive additive comprises at least a phosphazene compound in a liquid form or dissolved in in a first liquid solvent; (B) providing an anode; (C) combining the cathode, an optional separator, the anode, and a protective housing to form a cell; and (D) injecting a liquid mixture of a lithium salt, a curing agent, an optional flame retardant (if in a liquid state) and a second non-aqueous liquid solvent into the cell and polymerizing and/or crosslinking the reactive additive (via heat, UV, electron beam, or other high-energy radiation) to produce the rechargeable lithium cell. This may be followed by a step of partially or totally removing any un-polymerized solvent.

For the production of a lithium-ion cell, step (B) may comprise mixing particles of an anode material (e.g., Si, SiO, graphite, carbon particles, etc.), an optional conductive additive, an optional binder, an optional flame retardant, optional particles of an inorganic solid electrolyte powder, and a reactive additive (comprising a reactive phosphazene compound) to form at least one anode active layer supported on an anode current collector (e.g., Cu foil).

The following examples are presented primarily for the purpose of illustrating the best mode practice of the present disclosure, not to be construed as limiting the scope of the present disclosure.

Example 1: Solid Electrolyte Based on the General Formula [—NP(A)a(B)b—]$_x$

In a representative procedure, a 1-liter flask equipped with a thermometer, a stirrer, a dropping funnel and a condenser was charged with 58.0 g (0.167 mole) of hexachlorotriphosphazene, 50 ml of toluene and 158 g (2.0 moles) of pyridine, and the mixture was stirred. To the mixture was dropwise added 143 g (1.1 moles) of 2-hydroxyethyl methacrylate (HEMA) through the dropping funnel. The mixture was heated to 60° C. and the reaction was continued for 8 hours with stirring. After precipitated crystalline materials were filtered off, the solvent in the filtrate was distilled off under reduced pressures. The residual solution was dried to a desired level, leaving 136 g (yield: 91%) of a curable phosphazene compound in the form of a solution having a yellow color.

A benzol peroxide initiator (0.5% by weight) was added to the curable phosphazene compound in toluene to produce solution No. 1. A lithium salt, lithium hexafluorophosphate (LiPF$_6$), was dissolved in fluoroethylene carbonate (FEC) to form a 1.0 M solution (Solution No. 2). The lithium salt amount was varied to result in a final lithium salt-to-polyphosphazene ratio from 5/100 to 25/100. Solution No. 1 and Solution No. 2 were then mixed, well stirred, and injected into a dry battery cell. Most of the solvents were removed with the assistance of a vacuum pump. The resin was cured at 60° C. overnight. Two types of battery cells were studied in this example: a lithium/NCM-532 cell (initially the cell being lithium-free) and lithium-ion cell containing a Si-based anode and a NCM-532 cathode.

Example 2: Solid Electrolyte Based on the General Formula [—NP(A)a(B)b—]$_x$

A 1-liter flask equipped with a thermometer, a stirrer, a dropping funnel and a condenser was charged with 100 ml of tetrahydrofuran and 11.6 g (0.5 mole) of metallic sodium. To this mixture was dropwise added 55.5 g (0.55 mole) of 2,2,2-trifluoroethanol, and the mixture was then reacted under reflux until sodium was completely consumed. To this reaction mixture was dropwise added a solution of 39.6 g (0.111 mole) of hexachlorotriphosphazene in 100 ml of toluene, and the mixture was reacted under reflux for 2 hours. Thereafter, the temperature of the reaction mixture was dropped to room temperature and 191 g (1.47 mole) of HEMA was dropwise added to the reaction mixture slowly using the dropping funnel. The mixture was then heated to 60° C. and the reaction was continued for 8 hours at that temperature with stirring. Thereafter, precipitated crystalline materials and the catalyst were filtered off and the solvent in the filtrate was distilled off under reduced pressure. The residual solution was dried to a sufficient level, leaving 88 g (yield: 93%) of a curable phosphazene compound in the form of a solution having a yellow color.

A benzol peroxide initiator (0.5% by weight), lithium bis(oxalato)borate (LiBOB), and curable phosphazene compound (ratio of 0.5/10/100) were dispersed in a mixture of vinylene carbonate (VC) and toluene to form a 1.0 M solution. The solution was injected into a dry battery cell. Most (>80%) of the solvents were removed with the assistance of a vacuum pump. The resin was cured at 65° C. overnight. Two types of battery cells were studied in this example: a lithium/NCM-811 cell (initially the cell being lithium-free) and lithium-ion cell containing a Si-based anode and a NCA cathode.

Example 3: Solid Electrolyte Based on Poly[Bis(2-Hydroxyethyl-Methacrylate)-Phosphazene] and Poly[(2-Hydroxyethyl-Methacrylate)-Graft-Poly(Lactic-Acid)-Phosphazene]

Poly[bis(2-hydroxyethyl-methacrylate)-phosphazene] was obtained by nucleophilic condensation reactions at different concentrations of the substituents. Specifically, the scheme of the poly(organophosphazenes) synthesis by nucleophilic substitution is shown in Reaction 1 earlier. The single substituted and co-substituted poly(dichlorophosphazenes) (PZs) were obtained from poly(dichlorophosphazene) by melt ring-opening polymerization of hexachlorocyclotriphosphazene (HCCP) under vacuum at 250° C. for 3 h. After this time, the polymer was dissolved at room temperature in anhydrous THF, and it was separated by precipitation into n-heptane.

The substitution of poly(dichlorophosphazene) (PZ) with pentaerythritol triacrylate (PEATA) was made at two molar ratios: 1:3 and 1:6 mmol PZ-PEATA. Triethylamine (TEA) was added at 1:1 mmol ratio PEATA:TEA as effective acceptor to trap hydrogen chloride. The PZ was dissolved in THF (10 mL) under stirring, after 10 min PEATA and TEA were added and the glass vial reactor was kept for two days at room temperature. The product was purified following the procedure described for PZ; the yield was 51%.

A methyl amine initiator (0.5% by weight), lithium bis(oxalato)borate (LiBOB), and curable phosphazene compound (ratio of 0.5/10/100) were dispersed in a mixture of vinylene carbonate (VC) and toluene to form a 1.0 M solution. The solution was injected into a dry battery cell. Most (>80%) of the solvents were removed with the assistance of a vacuum pump. The resin was cured at 65° C. overnight. Two types of battery cells were studied in this example: a lithium/NCM-811 cell (initially the cell being lithium-free) and lithium-ion cell containing a graphite-based anode and a NCM-622 cathode.

Example 4: 2,2,4,4,6,6-Hexakis(Vinyloxyethyl-enoxy)-2,2,4,4,6,6-Hexahydro-1,3,5,2,4,6-triazatriphosphorine The compound 2,2,4,4,6,6-Hexakis(vinyloxyethyl-enoxy)-2,2,4,4,6,6-hexahydro-1,3,5,2,4,6-triazatriphosphorine is prepared by the following reactions:

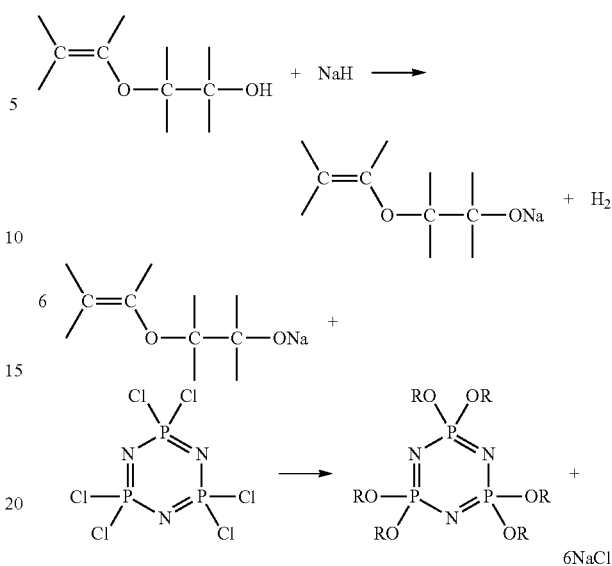

where R=the following structure:

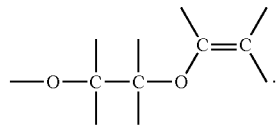

In a representative procedure, 16.80 g (0.10 mole) of sodium hydride (95%) was suspended in 700 ml of anhydrous THF and/or argon in a 2-liter three-necked flask with internal thermometer, dropping funnel, and reflux condenser. While cooling in an ice bath, 61.67 g (0.70 mole) of ethylene glycol mono-vinyl ether was then added slowly through a dropping funnel over a period of 90 min. Stirring was then continued at about 50° C. for a total of 20 h. The contents of the flask gradually exhibited a brown color.

Subsequently, a solution of 34.79 g (0.10) mole of phosphonitrile chloride $(NPCl_2)_3$ in 200 ml of anhydrous THF was added slowly (90 min) through a dropping funnel. Water bath cooling was necessary during this addition to keep the temperature below 30° C. Stirring was continued for 1 h at room temperature, and the batch was then heated to an internal temperature of 50° C. Stirring was continued overnight (total 24 h) at this temperature.

The mixture was then allowed to cool to room temperature and was filtered by suction. Almost all of the THF was removed from the brown filtrate in a rotary evaporator; 250 ml of diethyl ether and 250 ml of deionized water were added, and the mixture was transferred to a separatory funnel. The ether phase was separated, and the aqueous phase was extracted two more times with 125 ml portions of diethyl ether. The combined ether phases were shaken three times with 50 ml portions of deionized water, which can lighten the mixture considerably. The ether phase was separated and dried over sodium sulfate. After filtering off the drying agent and evaporating the solvent in a rotary evaporator, 62.84 g (0.096 mole, corresponding to 96% of the theoretical amount) of a clear yellow liquid was obtained. The product may be further purified if so desired. The product is readily soluble in chloroform, tetrahydrofuran, diethyl ether, isopropanol, ethyl acetate, and toluene. The phosphazene derivatives herein produced, along with a lithium salt (e.g. 10% lithium borofluoride (LiBF$_4$) or lithium trifluoro-methanesulfonate (LiCF$_3$SO$_3$)) were then dissolved in solvents, such as ethyl acetate (EA), fluoroethylene carbonate (FEC), and hydrofluoroether (HFE), to produce precursor or reactive liquid electrolyte compositions.

The lithium-ion cells prepared in this example comprise an anode of meso-carbon micro-beads (MCMB, an artificial graphite), a cathode of NCM-622 particles, and a porous PE/PP membrane as a separator. The reactive liquid electrolyte compositions were injected into dry battery cells at 45° C., allowing the electrolyte to fully permeate into both the anode and the cathode to wet out the surfaces of anode and cathode active materials. The cells were then irradiated with electron beam at room temperature until a total dosage of 40 Gy was reached. In-situ crosslinking of the polyphosphazene polymer in the battery cell was accomplished. Crosslinked networks are capable of holding any liquid electrolyte in place, preventing any leakage issue.

Additionally, polymer films were cast on a glass surface and some of the films were subjected to the same dosage of electron beams. The room temperature lithium-ion conductivity values of the polymers (each containing approximately 10% by weight lithium salt, LiBF$_4$) were increased from approximately $3.8 \times 10^{-4}$ S/cm for un-crosslinked polymer to approximately $2.6 \times 10^{-3}$ S/cm for electron beam-cured polymers.

Electrochemical measurements (CV curves) were carried out in an electrochemical workstation at a scanning rate of 1-100 mV/s. The electrochemical performance of the cells was evaluated by galvanostatic charge/discharge cycling at a current density of 50-500 mA/g using an Arbin electrochemical workstation. Testing results indicate that the cells containing quasi-solid or solid-state electrolytes obtained by in situ curing perform very well in terms of cycling stability and the energy storage capacity and yet these cells are flame resistant and relatively safe.

Example 5: Electrolytes Containing Homo-Polymers and Copolymers from Vinyl Ether Phosphazene Derivatives Flame-resistant electrolyte compositions (liquid solutions), quasi-solid electrolytes, and solid-state electrolytes are prepared from vinyl ether phosphazene derivative with mixed substitution, which were prepared according to the following reactions:

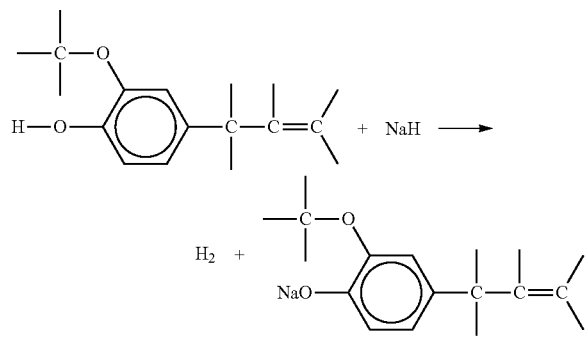

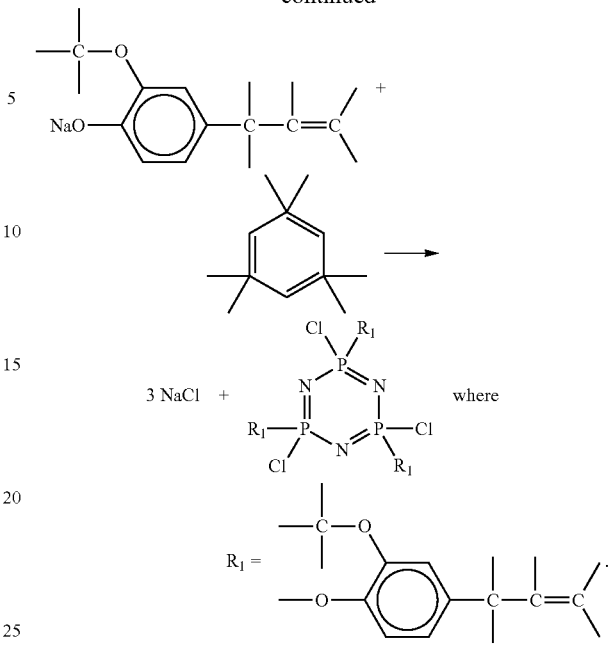

In a representative procedure, 9.60 g (0.40 mole) of sodium hydride was placed in a 1000-ml three-necked flask with KPG stirrer, dropping funnel, and internal thermometer, and was slurred with 100 ml of anhydrous tetrahydrofuran. While cooling with ice/salt, a solution of 65.68 g (0.40 mole) of eugenol in 50 ml of anhydrous tetrahydrofuran (THF) was then added dropwise (gas evolution, addition time 45 min). Stirring was continued for 1 h at room temperature, and then a solution of 46.36 g (0.133 mole) of (NPCl$_2$)$_3$ in 150 ml of anhydrous THF was added.

The mixture was stirred for 60 h at room temperature, transferred to a single-necked flask, and the solvent is evaporated by rotation. The product was taken up in 150 ml of diethyl ether and 150 ml of deionized water, and the phases were separated in a separatory funnel. The aqueous phase was washed twice with 10 ml portions of deionized water. The combined orange-colored ether phases were dried over anhydrous sodium sulfate. The drying agent was filtered off and the clear filtrate was stirred for 30 min at room temperature with activated charcoal. After repeated filtration and solvent removal by rotary evaporation, 94.94 g (0.130 mole, corresponding to 98% of the theoretical amount) of a viscous, clear, brown-colored liquid was obtained. The product may be further filtered through a short silica gel column if so desired. The product has a molecular weight 730.89 g/mole and is readily soluble in toluene, chloroform, ethyl acetate, diethyl ether, tetrahydrofuran, and acetone, etc.

The vinyl ether phosphazene derivatives herein produced, along with a lithium salt (e.g. 10% lithium borofluoride (LiBF$_4$)), were then dissolved in solvents, such as ethyl acetate (EA), fluoroethylene carbonate (FEC), and hydrofluoroether (HFE), to produce precursor or reactive electrolyte compositions.

The lithium-ion cells prepared in this example comprise an anode of graphene-protected Si particles, a cathode of NCM-622 particles, and a porous PE/PP membrane as a separator. In several samples, a garnet-type solid electrolyte (Li$_7$La$_3$Zr$_2$O$_{12}$ (LLZO) powder) was added into the cathode (NCM-532) in the anode-less lithium battery.

Example 6: Cathode and Anode Layers Containing a Quasi-Solid or Solid-State Electrolyte Electrode layers comprising particles of anode active materials (e.g. MCMB particles) in the anode and cathode active materials (e.g. LiCoO$_2$ particles in the cathode) in contact with a polyphosphazene electrolyte were prepared from [NPCl$_2$]$_n$ and a propylene oxide oligomer according to the following reaction:

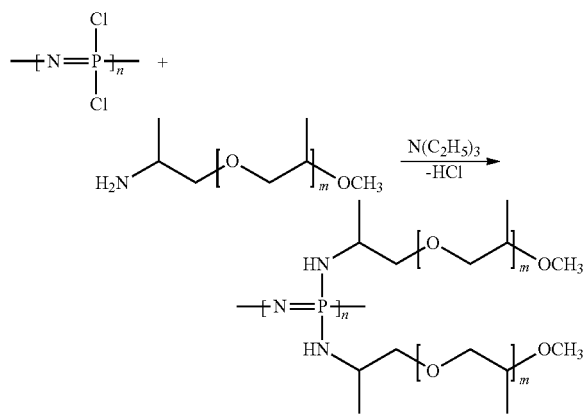

In a representative procedure, 4.69 g of [NPCl$_2$]$_n$ were dissolved in 200 ml of anhydrous THF to form a polymer solution. Then, 11.3 ml of triethyl amine (TEA) and 50 ml of propylene oxide oligomer were then added to the polymer solution. The resulting reaction mixture was stirred for 24 h at room temperature. The solvent was then removed under vacuum yielding a highly viscous yellowish polymer solution which was dialyzed against water for 5 days. Removal of water after dialysis yielded a slightly yellowish, highly viscous polymer.

The substituted polyphosphazene, 15% by weight of lithium hexafluorophosphate (LiPF$_6$), and 0.5% by weight of benzophenone as photoinitiator were then dispersed/dissolved in a 50/50 solvent mixture of fluoroethylene carbonate (FEC) and vinylene carbonate (VC) to form a solution. After stirring at room temperature for 1 hour, the solution was added with LiCoO$_2$ particles and 7% by weight carbon black (Super-P) to form a reactive slurry. The slurry was coated on a surface of Al foil to form a layer of cathode, which was exposed to UV light for 20 minutes to induce crosslinking reaction.

A layer of anode was prepared in a similar manner, but the electrode active material was MCMB particles. The anode layer was coated on a Cu foil surface to make an anode electrode. The anode layer was also exposed to UV light to initiate the crosslinking reaction.

In a separate experiment, a separator membrane was prepared by replacing the electrode active material with 25% by weight of a garnet-type solid electrolyte powder, Li$_7$La$_3$Zr$_2$O$_{12}$ (LLZO), which was mixed with the reactive slurry containing the polymer, the lithium salt, the photoinitiator, but no carbon black, in the solvent. This reactive slurry was cast on a glass surface to obtain a separator layer, which was then peeled off from the glass to obtain a free-standing separator layer.

The anode, separator, and cathode layers were then stacked together and encased by a protective housing to make a battery cell.

Electrochemical measurements (CV curves) were carried out in an electrochemical workstation at a scanning rate of 1-100 mV/s. The electrochemical performance of the cells was evaluated by galvanostatic charge/discharge cycling at a current density of 50-500 mA/g using an Arbin electrochemical workstation. Testing results indicate that the cells containing quasi-solid or solid-state electrolytes obtained by in situ curing perform very well. These cells are flame resistant and relatively safe.

The invention claimed is:

1. A rechargeable lithium battery comprising an anode, a cathode, and a quasi-solid or solid-state electrolyte in ionic communication with the anode and the cathode, wherein the electrolyte comprises a polyphosphazene polymer and a lithium salt dissolved or dispersed in the polymer, wherein the lithium salt occupies a weight fraction from 0.1% to 50% based on the total weight of the lithium salt and the polyphosphazene polymer combined;
   wherein the polyphosphazene polymer permeates into the anode and/or the cathode and in physical contact with and/or chemically bonded to an anode active material inside the anode and/or in physical contact with and/or chemically bonded to a cathode active material inside the cathode; and
   wherein the electrolyte further comprises from 0% to 50% by weight of a non-aqueous liquid solvent dispersed in the polymer, based on the total weight of the lithium salt, the polymer, and the non-aqueous liquid solvent combined,
   wherein the polyphosphazene polymer is crosslinked by a crosslinking agent selected from a phenylene group, poly (diethanol) diacrylate, poly (ethyleneglycol) dimethacrylate, poly (diethanol) dimethylacrylate, poly (ethylene glycol) diacrylate, or a combination thereof.

2. The rechargeable lithium battery of claim 1, wherein the polyphosphazene polymer is selected from the groups consisting of (a) linear polymers having the formula (N=PR$^1$R$^2$)$_n$, where R$^1$ and R$^2$ are organic groups, and n is an integer; (b) cyclolinear and cyclomatrix polymers in which phosphazene rings are connected together by organic chain units; (c) block copolymer, star, dendritic, or comb structures; and combinations thereof.

3. The rechargeable lithium battery of claim 1, wherein the polyphosphazene polymer is synthesized from a precursor monomer, oligomer, or reactive polymer selected from Chemical formula 1, Chemical formula 2, Chemical formula 3, Chemical formula 4, or a combination thereof:

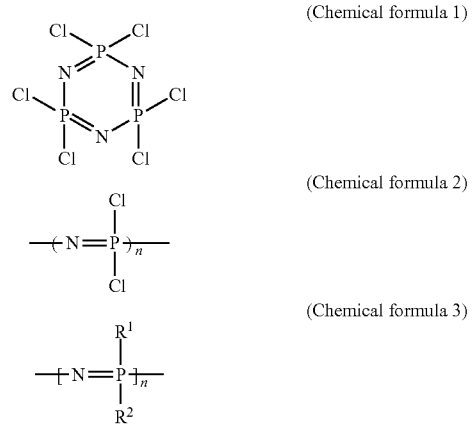

-continued (Chemical formula 4)

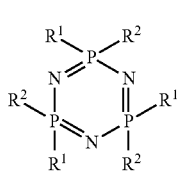

wherein $R^1$ and $R^2$ are independently selected from an organic group or an organometallic group, and n is an integer.

4. The rechargeable lithium battery of claim 1, wherein said electrolyte further comprises a flame-retardant additive selected from a halogenated flame retardant, phosphorus-based flame retardant, melamine flame retardant, metal hydroxide flame retardant, silicon-based flame retardant, biomolecular flame retardant, or a combination thereof.

5. The rechargeable lithium battery of claim 1, which is a lithium metal secondary cell, a lithium-ion cell, a lithium-sulfide cell, a lithium-ion sulfur cell, a lithium-selenium cell, or a lithium-air cell.

6. The rechargeable lithium battery of claim 1, wherein the cathode comprises a cathode active material selected from lithium nickel manganese oxide ($LiNi_aMn_{2-a}O_4$, $0<a<2$), lithium nickel manganese cobalt oxide ($LiNi_nMn_mCo_{1-n-m}O_2$, $0<n<1$, $0<m<1$, $n+m<1$), lithium nickel cobalt aluminum oxide ($LiNi_cCo_dAl_{1-c-d}O_2$, $0<c<1$, $0<d<1$, $c+d<1$), lithium manganate ($LiMn_2O_4$), lithium iron phosphate ($LiFePO_4$), lithium manganese oxide ($LiMnO_2$), lithium cobalt oxide ($LiCoO_2$), lithium nickel cobalt oxide ($LiNi_pCo_{1-p}O_2$, $0<p<1$), or lithium nickel manganese oxide ($LiNi_qMn_{2-q}O_4$, $0<q<2$).

7. The rechargeable lithium battery of claim 1, which is a lithium-ion cell wherein the anode comprises an anode active material selected from the group consisting of:
(a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium aluminate, lithium transition metal oxide, ZnC0204; (f) carbon or graphite particles (g) prelithiated versions thereof; and (h) combinations thereof.

8. The rechargeable lithium battery of claim 1, further comprising a separator disposed between the anode and the cathode wherein the separator comprises the quasi-solid or solid-state electrolyte.

9. The rechargeable lithium battery of claim 1, further comprising a separator disposed between the anode and the cathode, wherein the separator comprises polymeric fibers, ceramic fibers, glass fibers, or a combination thereof, which are dispersed in or bonded by the polyphosphazene polymer.

10. A rechargeable lithium battery comprising an anode, a cathode, and a quasi-solid or solid-state electrolyte in ionic communication with the anode and the cathode, wherein the electrolyte comprises a polyphosphazene polymer and a lithium salt dissolved or dispersed in the polymer, wherein the lithium salt occupies a weight fraction from 0.1% to 50% based on the total weight of the lithium salt and the polyphosphazene polymer combined;

wherein the polyphosphazene polymer permeates into the anode and/or the cathode and in physical contact with and/or chemically bonded to an anode active material inside the anode and/or in physical contact with and/or chemically bonded to a cathode active material inside the cathode; and wherein the electrolyte further comprises from 0.1% to 50% by weight of a non-aqueous liquid solvent dispersed in the polymer, based on the total weight of the lithium salt, the polymer, and the non-aqueous liquid solvent combined;

wherein the non-aqueous liquid solvent includes a sulfone or sulfide selected from vinyl sulfone, allyl sulfone, vinyl sulfide, a vinyl-containing variant of TrMS, MTrMS, TMS, EMS, MMES, EMES, EMEES, or a combination thereof:

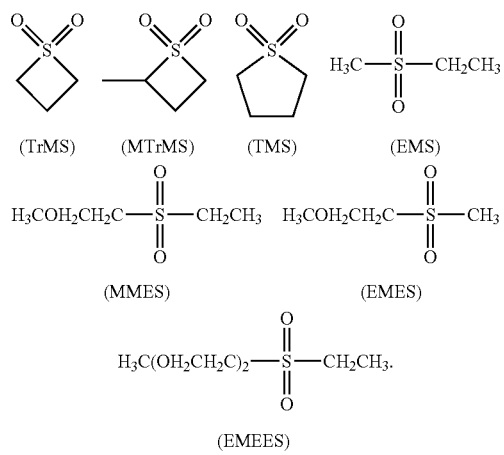

11. The rechargeable lithium battery of claim 10, wherein the vinyl sulfone or vinyl sulfide is selected from ethyl vinyl sulfide, phenyl vinyl sulfide, divinyl sulfone, or a combination thereof, wherein the vinyl sulfone does not include ethyl vinyl sulfone.

12. The rechargeable lithium battery of claim 10, wherein the liquid solvent further includes a nitrile, which is a dinitrile.

13. A rechargeable lithium battery comprising an anode, a cathode, and a quasi-solid or solid-state electrolyte in ionic communication with the anode and the cathode, wherein the electrolyte comprises a polyphosphazene polymer and a lithium salt dissolved or dispersed in the polymer, wherein the lithium salt occupies a weight fraction from 0.1% to 50% based on the total weight of the lithium salt and the polyphosphazene polymer combined;

wherein the polyphosphazene polymer permeates into the anode and/or the cathode and in physical contact with and/or chemically bonded to an anode active material inside the anode and/or in physical contact with and/or chemically bonded to a cathode active material inside the cathode; and wherein the electrolyte further comprises from 0.1% to 50% by weight of a non-aqueous liquid solvent dispersed in the polymer, based on the total weight of the lithium salt, the polymer, and the non-aqueous liquid solvent combined;

wherein the liquid solvent includes a siloxane or silane selected from alkylsiloxane (Si—O), alkylsilane (Si—C), liquid oligomeric silaxane (—Si—O—Si—), or a combination thereof.

14. A rechargeable lithium battery comprising an anode, a cathode, and a quasi-solid or solid-state electrolyte in ionic communication with the anode and the cathode, wherein the electrolyte comprises a polyphosphazene polymer and a lithium salt dissolved or dispersed in the polymer, wherein the lithium salt occupies a weight fraction from 0.1% to 50% based on the total weight of the lithium salt and the polyphosphazene polymer combined;

wherein the polyphosphazene polymer permeates into the anode and/or the cathode and is in physical contact with and/or chemically bonded to an anode active material inside the anode and/or in physical contact with and/or chemically bonded to a cathode active material inside the cathode; and wherein the electrolyte further comprises from 0% to 50% by weight of a non-aqueous liquid solvent dispersed in the polymer, based on the total weight of the lithium salt, the polymer, and the non-aqueous liquid solvent combined;

wherein the polyphosphazene polymer forms a cross-linked network with an amide selected from N,N-dimethylacetamide, N,N-diethylacetamide, N,N-dimethylformamide, N,N-diethylformamide, or a combination thereof.

15. A rechargeable lithium battery comprising an anode, a cathode, and a quasi-solid or solid-state electrolyte in ionic communication with the anode and the cathode, wherein the electrolyte comprises a polyphosphazene polymer and a lithium salt dissolved or dispersed in the polymer, wherein the lithium salt occupies a weight fraction from 0.1% to 50% based on the total weight of the lithium salt and the polyphosphazene polymer combined;

wherein the polyphosphazene polymer permeates into the anode and/or the cathode and is in physical contact with and/or chemically bonded to an anode active material inside the anode and/or in physical contact with and/or chemically bonded to a cathode active material inside the cathode; and wherein the electrolyte further comprises from 0% to 50% by weight of a non-aqueous liquid solvent dispersed in the polymer, based on the total weight of the lithium salt, the polymer, and the non-aqueous liquid solvent combined;

wherein the polyphosphazene polymer is crosslinked by a crosslinking agent that comprises a compound having at least one reactive group selected from a hydroxyl group, an amino group, an imino group, an amide group, an amine group, an acrylic group, an acrylic ester group, or a mercapto group in the molecule.

16. A rechargeable lithium battery comprising an anode, a cathode, and a quasi-solid or solid-state electrolyte in ionic communication with the anode and the cathode, wherein the electrolyte comprises a polyphosphazene polymer and a lithium salt dissolved or dispersed in the polymer, wherein the lithium salt occupies a weight fraction from 0.1% to 50% based on the total weight of the lithium salt and the polyphosphazene polymer combined;

wherein the polyphosphazene polymer permeates into the anode and/or the cathode and in physical contact with and/or chemically bonded to an anode active material inside the anode and/or in physical contact with and/or chemically bonded to a cathode active material inside the cathode; and wherein the electrolyte further comprises from 0% to 50% by weight of a non-aqueous liquid solvent dispersed in the polymer, based on the total weight of the lithium salt, the polymer, and the non-aqueous liquid solvent combined, wherein said polyphosphazene polymer forms a mixture, copolymer, semi-interpenetrating network, or simultaneous interpenetrating network with a second polymer selected from poly (ethylene oxide), polypropylene oxide, poly (ethylene glycol), poly (acrylonitrile), poly (methyl methacrylate), poly (vinylidene fluoride), poly bis-methoxy ethoxyethoxide-phosphazene, polyvinyl chloride, polydimethylsiloxane, poly (vinylidene fluoride)-hexafluoropropylene, cyanoethyl poly (vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly (ethylene glycol) diacrylate, poly (ethylene glycol) methyl ether acrylate, a sulfonated derivative thereof, or a combination thereof.

* * * * *